United States Patent
Yam et al.

(10) Patent No.: US 7,565,266 B2
(45) Date of Patent: Jul. 21, 2009

(54) WEB-BASED SYSTEM OF PRODUCT PERFORMANCE ASSESSMENT AND QUALITY CONTROL USING ADAPTIVE PDF FITTING

(75) Inventors: Hongsee Yam, Singapore (SG); Teck Heng Lim, Singapore (SG); Hwaliang Ng, Singapore (SG); Timothy ChinSoon Yoap, Singapore (SG)

(73) Assignee: Seagate Technology, LLC, Scotts Valley, CA (US)

( * ) Notice: Subject to any disclaimer, the term of this patent is extended or adjusted under 35 U.S.C. 154(b) by 62 days.

(21) Appl. No.: 11/353,739

(22) Filed: Feb. 14, 2006

(65) Prior Publication Data

US 2007/0192060 A1   Aug. 16, 2007

(51) Int. Cl.
G06F 19/00 (2006.01)
(52) U.S. Cl. .................. 702/181; 702/105; 700/28; 700/30; 703/6
(58) Field of Classification Search .......... 702/105, 702/181; 708/200; 700/28–30, 95, 108, 700/110; 703/2, 6, 13, 3; 706/13
See application file for complete search history.

(56) References Cited

U.S. PATENT DOCUMENTS

| | | | |
|---|---|---|---|
| 6,421,467 B1* | 7/2002 | Mitra | 382/240 |
| 6,427,127 B1* | 7/2002 | Cunningham | 702/45 |
| 6,473,703 B1* | 10/2002 | Kurtzberg et al. | 702/84 |
| 6,782,295 B2* | 8/2004 | Martz et al. | 700/28 |
| 6,865,567 B1* | 3/2005 | Oommen et al. | 707/2 |
| 6,892,163 B1* | 5/2005 | Herzog et al. | 702/181 |
| 6,917,839 B2* | 7/2005 | Bickford | 700/30 |
| 6,988,096 B2* | 1/2006 | Gupta et al. | 707/3 |
| 7,050,956 B2* | 5/2006 | Uysal et al. | 703/6 |
| 7,082,379 B1* | 7/2006 | Bickford et al. | 702/178 |
| 7,324,924 B2* | 1/2008 | Barajas et al. | 702/189 |
| 2002/0032708 A1* | 3/2002 | Gupta et al. | 707/539 |
| 2003/0040954 A1* | 2/2003 | Zelek et al. | 705/10 |
| 2004/0204906 A1* | 10/2004 | Lambert et al. | 702/181 |
| 2005/0192954 A1* | 9/2005 | Gupta et al. | 707/4 |
| 2005/0218925 A1* | 10/2005 | Miao et al. | 324/767 |
| 2006/0161460 A1* | 7/2006 | Smitherman et al. | 705/3 |
| 2006/0179089 A1* | 8/2006 | Moriya | 708/200 |

\* cited by examiner

Primary Examiner—Carol S Tsai
(74) Attorney, Agent, or Firm—Shumaker & Sieffert, P.A.

(57) ABSTRACT

A data analysis system analyzes data sets that are characterized by a wide variety of probability density functions (PDFs), and also analyzes mixed populations, i.e., a single data set containing subsets of data that each fit a different distribution. The data analysis system receives quality control data from a product manufacturing or product testing floor, determines whether the data is a mixed population, and fits the data with a variety of PDFs. The data analysis system selects the best fitting PDF based on statistical characteristics calculated for each fitted PDF. The data analysis system generates performance capability parameters based on the best fitting PDF, and may generate reports illustrating the performance capability parameters. The data analysis system also adjusts statistical control limits to provide a more reliable process trigger and control plan. In this manner, the data analysis system may more accurately report product performance.

32 Claims, 22 Drawing Sheets

WEB-BASED SYSTEM OF PRODUCT PERFORMANCE ASSESSMENT AND QUALITY CONTROL USING ADAPTIVE PDF FITTING

TECHNICAL FIELD

The present disclosure relates to quality control systems for product performance assessment.

BACKGROUND

In a manufacturing factory, accurate and consistent performance assessment from sub-assembly and assembly floors is critical to design engineers' ability to optimize product design, as well as to manufacturing engineers' ability to control the process to maintain quality of the outgoing product. In some systems, a product's performance is assessed throughout the product life cycle, from development to volume production, using data management systems that provide a number of performance parameters, such as Yield, $C_{pk}$, Xbar-S and Xbar-R charts. However, traditional data management systems are typically based on an assumption that data is distributed according to a normal distribution.

In practice, this assumption often fails due to the existence of outlying data points. Outlying data points may give rise to a mixed population data set, i.e., a single data set containing subsets of data that each fit a different distribution, in which each data subset may need to be separately analyzed. Moreover, many distributions are so highly skewed that even a large sample size (e.g., 30) is not enough to make the data normally distributed. In this case, the data may be better described by a probability density function (PDF) other than the normal distribution, such as a Weibull distribution, a Laplace distribution, an exponential distribution, or other distribution.

The design phase of product development may implement "scorecards" as a management tool. Scorecards display a list of important parameters, referred to as "Critical to Quality" (CTQ) parameters. Product sub-system design teams and process development teams each have respective scorecards. Each team collects performance CTQ raw data, and manually analyzes the raw data to obtain a process capability Z-score for each CTQ parameter for their respective scorecards. At various phases of the design cycle, the scorecards are assessed to ensure Z-scores meet minimum requirements. Design changes may then be made to improve upon those CTQ parameters with unacceptable Z-scores. As design changes tend to be costly and sometimes affect the time-to-market of a product launch, the accuracy of the scorecard data analysis becomes a critical factor in the design change decision-making process.

One example of a process control and triggering system calculates triggers based on a parameter known as $C_{pk}$. $C_{pk}$ is a measure of the capability of a process. The traditional formula for $C_{pk}$ assumes that data is normally distributed, and so a computed value of $C_{pk}$ is only accurate if the data is normally distributed. If the data does not follow a normal distribution, the $C_{pk}$ may over-estimate or under-estimate the capability of a process, triggering false quality alerts and potentially wasting resources. Due to the assumption of normality, existing statistical software used for product performance assessment in quality control systems may result in inaccurate performance assessment, high false trigger rates, and insensitivity to quality control problems.

SUMMARY

In general, the present disclosure is directed to a quality control system for product performance assessment. In particular, a data analysis system analyzes data sets that are characterized by a wide variety of probability density functions (PDFs), and also analyzes mixed populations, i.e., a single data set containing subsets of data that each fit a different distribution.

The data analysis system may receive quality control data from a product manufacturing or product testing floor. Instead of assuming that the data follows a normal distribution, the data analysis system determines whether the data is a mixed population, and fits the data with a variety of PDFs. The data analysis system selects the best fitting PDF based on statistical characteristics calculated for each fitted PDF. The data analysis system generates performance capability parameters based on the best fitting PDF, and may generate reports illustrating the performance capability parameters. The data analysis system also adjusts statistical control limits to provide a more reliable process trigger and control plan. In this manner, the data analysis system may more accurately report product performance.

In one embodiment, a method includes receiving data for a product, fitting the data with a plurality of PDFs, and selecting a PDF that best fits the data. The method further includes generating one or more performance capability parameters for the product based on the best fitting PDF, and generating a report that presents at least one of the performance capability parameters.

In another embodiment, a system includes a data acquisition module that acquires data for a product, a PDF fitting module that fits the data with a plurality of PDFs, selects a PDF that best fits the data, and generates one or more performance capability parameters for the product based on the best fitting PDF, a report generator that generates a report that presents at least one of the performance capability parameters.

In another embodiment, a computer-readable medium comprises instructions for causing a processor to receive data for a product, fit the data with a plurality of PDFs, select the PDF that best fits the data, generate one or more performance capability parameters for the product based on the best fitting PDF, and generate a report that presents at least one of the performance capability parameters.

In a further embodiment, a method comprises obtaining parameters associated with a PDF that best fits a set of data for a product, adjusting statistical control limits based on the parameters, receiving data associated with the product, and triggering a user when a predetermined amount of the received data is outside of the adjusted statistical control limits.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIGS. 6-9 are exemplary reports generated by the data analysis system as viewed on a user interface.

FIG. 10 is an exemplary screen illustration of an example CTQ definition page as viewed on a user interface.

DETAILED DESCRIPTION

Figure 1:
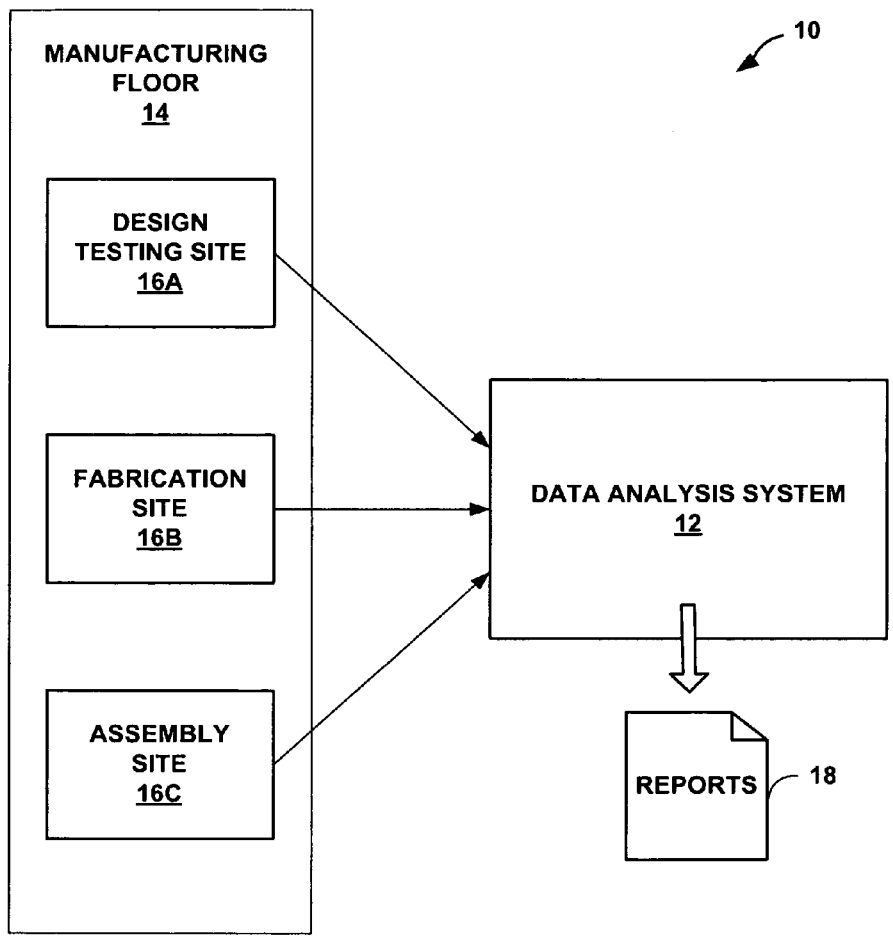
FIG. 1 is a block diagram illustrating a quality control system that includes a manufacturing floor and a data analysis system that analyzes data from the manufacturing floor.

FIG. 1 is a block diagram illustrating a quality control system 10 that includes a data analysis system 12 that analyzes data from a manufacturing floor 14. Data analysis system 12 may be used for new product development management, and for volume phase process monitoring and control. Manufacturing floor 14 includes several manufacturing sites 16A-16C (collectively, manufacturing sites 16). In particular, manufacturing floor 14 includes design testing site 16A, fabrication site 16B, and assembly site 16C. Product components may be designed and tested at site 16A. Product components may be fabricated and tested at fabrication site 16B. The product components are assembled and assembled products are tested at assembly site 16C. Manufacturing sites 16 may all be present in a single manufacturing facility. Alternatively, manufacturing floor 14 may comprise several geographically remote manufacturing facilities, with the manufacturing sites 16 distributed among them.

Data analysis system 12 collects data from manufacturing sites 16 and saves the data to a database (not shown). The data may be quality control data, such as data relating to components, products, or manufacturing processes. Data analysis system 12 may be a web-based system that obtains real-time quality control data automatically from manufacturing sites 16 via a network associated with quality control system 10. In the case of remote manufacturing sites, the remote manufacturing sites may send data to data analysis system 12 via a computer network, e.g., a virtual private network (VPN). As will be described in further detail below, data analysis system 12 fits the data with a plurality of probability density functions (PDFs), and selects a PDF that best fits the data. Data analysis system 12 uses the best-fitting PDF to generate performance capability parameters for the process, product, or component. Data analysis system 12 also adjusts statistical control limits to ensure a reliable process trigger and control plan.

Data analysis system 12 generates reports 18 in response to a query from a user. Further, the user may select predefined reports, or create customized reports. For example, administrator 15 may use reports 18 to display performance of a quality control parameter over time, display performance summaries for products, or display scorecards of performance parameters. Scorecard reports display a list of parameters, referred to as "Critical to Quality" (CTQ) parameters. Data analysis system 12 analyzes raw data to obtain a process capability Z-score for each CTQ parameter on a scorecard. Data analysis system 12 saves reports 18 within a database. The user may view reports 18 by a web-based application, e.g., a web browser, in the hypertext markup language (HTML) format. The user may direct data analysis system 12 to export reports 18 to higher layer applications in a variety of formats. For example, data analysis system 12 may export reports 18 in the portable document format (PDF), a data description format such as the extensible markup language (XML), or a spreadsheet format.

Data analysis system 12 may require a particular procedure for allowing new CTQ parameters to be added. For example, a process owner may be required to raise a request to get the privilege for setting up the CTQ parameter. The process owner may use data analysis system 12 to set up a project management professional (PMP) flag under the Z-score CTQ list. Once the CTQ parameter has been submitted, data analysis system 12 may send an email notification to the manager for approval. The process owner may utilize a user interface of data analysis system 12 to define a number of parameters for the CTQ, such as in-control Average Run Length ($ARL_{ic}$), which defines how many false triggers the user will tolerate for the control chart, critical mean shift, the number of tails (one tail or two tails) for the control limit, next baseline PDF data, and next baseline PDF sample size. Data analysis system 12 may automatically generate other parameters, such as a baseline PDF with parameters (e.g., mean, standard deviation, shape, $\alpha$, and $\beta$), offset, and p-value if trim limit is set, lower control limit (LCL) and upper control limit (UCL) for X-bar/S charts, Z-reference, recommended $ARL_{ic}$, and recommended out-of-control ARL ($ARL_{ooc}$), which defines how sensitive the control chart is in detecting the drift when it happens.

Figure 2:
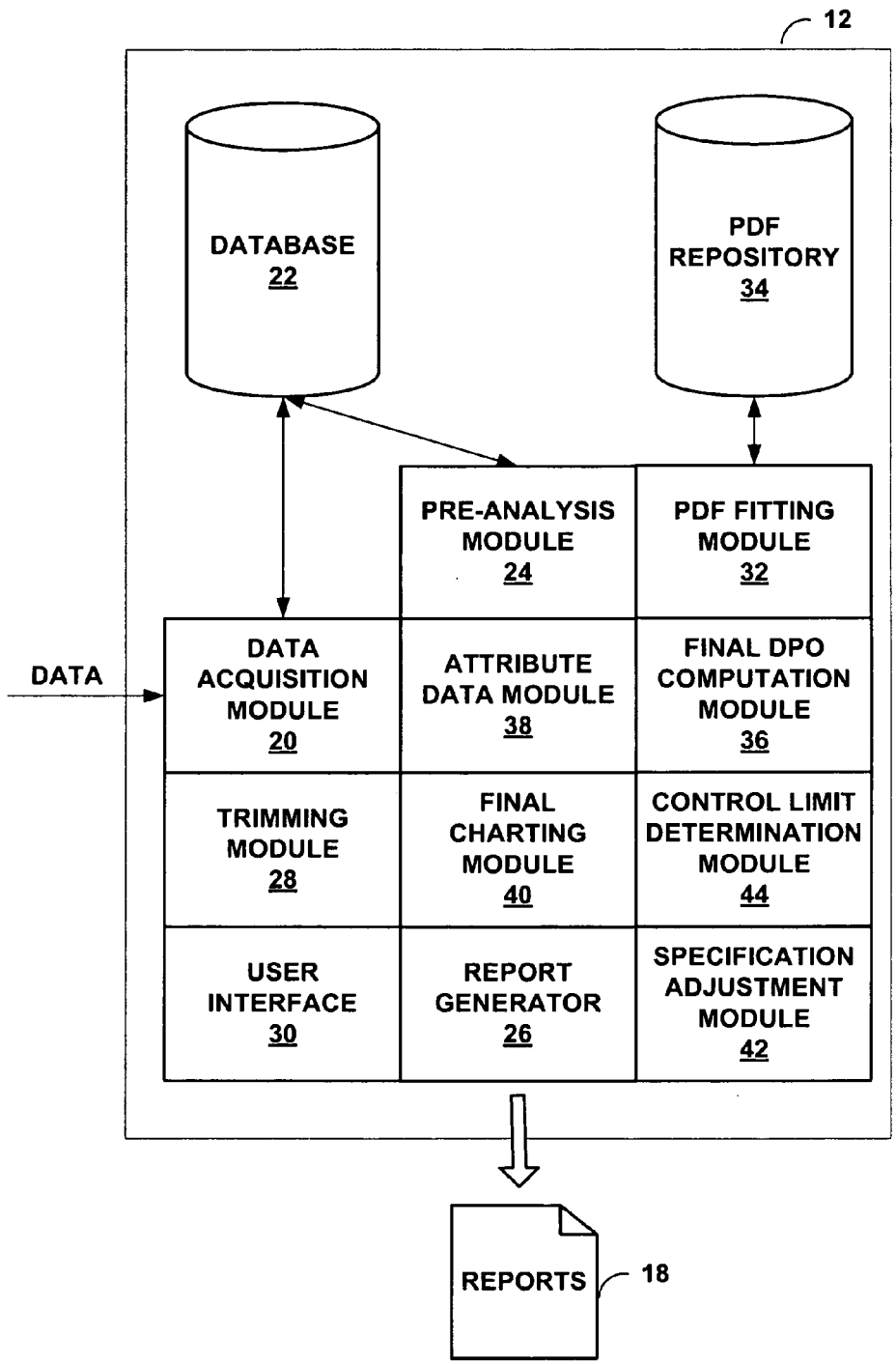
FIG. 2 is a block diagram illustrating the data analysis system in further detail.

FIG. 2 is a block diagram illustrating data analysis system 12 in further detail. Data analysis system 12 automatically collects real-time data from manufacturing floor 14 using data acquisition module 20. Data analysis system 12 stores the collected data in database 22. The data is analyzed by data analysis system 12 to generate performance capability parameters such as defects per opportunity (DPO), $C_{pk}$, Z-scores, and Z-margins. A Z-score is an indication of performance capability for a product. A Z-score is a computed equivalent to one tail point on the standard normal distribution describing the performance capability. A higher Z-score indicates a better performance capability.

Data acquired by data acquisition module 20 may be variable data or attribute data. Variable data is quantitative data that may be continuous or discrete. Attribute data is binary, qualitative data that may be counted for analysis, and may be in the form of a pass/fail yield. When the collected data is variable data, pre-analysis module 24 performs preliminary steps in the process of computing a Z-score. Pre-analysis module 24 may cause a pre-analysis report to be generated via report generator 26. Trimming module 28 operates when a data set being analyzed represents a mixed data population, i.e., different sections of the data are represented by different distributions. In the mixed population situation, trimming module 28 allows a user to select appropriate trimming limits via user interface 30 to trim a raw data column into separate sections, each representing a different data distribution. Alternatively, trimming module 28 may automatically select trimming limits when the data contains different data distributions.

Probability density function (PDF) fitting module 32 stores a plurality of probability density functions in PDF repository 34. For example, PDF repository 34 may contain probability density functions for distributions such as normal distribution, uniform distribution, Laplace distribution, Logistic distribution, exponential distribution, Weibull distribution, skewed distributions that are normal after a Box-Cox transformation, Log-Logistic distribution, or other probability density functions. PDF fitting module 32 fits the data with two or more of the stored PDFs, calculates a fitting parameter such as a $\chi^2$ goodness-of-fit indicator for each of the fitted PDFs, and selects the PDF that best fits the data based on the $\chi^2$ indicator. Probability density functions for some of the PDFs contained in PDF repository 34 will be described below.

The probability density function of a normal distribution is given by:

$$f(x) = \frac{1}{\sigma\sqrt{2\pi}} e^{-\frac{1}{2}\left(\frac{x-\mu}{\sigma}\right)^2} \text{ for } -\infty < x < \infty, \tag{1}$$

where $\mu$ is the mean and $\sigma$ is the standard deviation. The mean $\mu$ may be estimated using the sample average, $$\mu \approx \overline{X} = \frac{\sum_{i=1}^{n} x_i}{n},$$

and $\sigma$ may be estimated using the sample standard deviation, $$\sigma \approx s = \sqrt{\frac{\sum_{i=1}^{n}(x_i - \overline{x})^2}{n-1}}.$$

The probability density function of an exponential distribution is given by:

$$f(x) = \lambda e^{-\lambda x}, x > 0 \tag{2}$$

and $$F(x) = 1 - e^{-\lambda x}, \tag{3}$$

where $\lambda$ may be estimated by a coefficient $\beta_1$ of a linear regression of the following equation when $\beta_0$ is set to 0:

$$\lambda x = \ln\left[\frac{1}{1 - F(x)}\right].$$

The value of x must be greater than zero, so where this is not the case in a dataset, the entire dataset may be offset, such that the minimum value of the dataset is equal to 1% of the data range or 0.5, whichever is smaller.

The probability density function of a Weibull/3-Parameter Weibull distribution is given by:

$$F(x) = 1 - e^{-\left(\frac{x-\gamma}{\alpha}\right)^\beta}. \tag{4}$$

By rearranging the equation and taking the natural log on both sides of the equation to obtain following form, $\alpha$ and $\beta$ may be estimated by the estimated coefficients of a linear regression:

$$\ln\left[\ln\frac{1}{1-F(x)}\right] = \beta\ln x - \beta\ln\alpha. \tag{5}$$

Searching for the optimum $\gamma$ is an iterative procedure.

The probability density function of a uniform distribution is given by:

$$f(x) = \frac{1}{(b-a)}, \tag{6}$$

where b is estimated by the maximum value of the data, and a is estimated by the minimum value of the data.

The probability density function of a Laplace distribution is given by:

$$f(x) = \frac{1}{2\beta} e^{\left(-\frac{|x-\alpha|}{\beta}\right)}, \tag{7}$$

where $\alpha$ may be estimated by the median of the data, and $\beta$ may be estimated by the mean of the absolute deviation from the median of the data.

For the Box-Cox power transformation, the data may be transformed with a power value ($\lambda$) of −1, −0.5, 0.5, 2, 3, and the natural logarithm. A normal distribution may then be force-fitted with the transformed data using the mean and standard deviation of the transformed data as the parameters. Since the power of −0.5, 0.5, and natural log of a negative number is not a real number, the dataset needs to be offset such that the minimum value of the dataset is equal to 1% of the data range or 0.5, whichever is smaller.

The probability density function of a Logistic distribution is given by:

$$f(x) = \frac{e^{-\frac{(x-a)}{b}}}{b\left[1 + e^{-\frac{(x-a)}{b}}\right]^2}, \ b > 0, \tag{8}$$

where $\alpha$ is a location parameter and b is a scale parameter.

The probability density function of a 3-parameters Log-Logistic distribution is given by:

$$f(x) = \frac{1}{b(x-\theta)} \frac{e^{-\left[\frac{\ln(x-\theta)-\alpha}{b}\right]}}{\left[1+e^{-\left[\frac{\ln(x-\theta)-\alpha}{b}\right]}\right]^2}, \quad x > \theta, b > 0, \quad (9)$$

where α is a location parameter, b is a scale parameter, and θ is a threshold parameter.

The probability density functions explained above are merely exemplary; additional probability density functions not discussed above may be used by PDF fitting module 32. After PDF fitting module 32 fits the data with various PDFs, final defects per opportunity (DPO) computation module 36 computes a long-term DPO for the data being analyzed. When the collected data is attribute data, as opposed to variable data as discussed above, attribute data module 38 analyzes the attribute data to determine a long-term DPO. For both variable and attribute data, final charting module 40 outputs the final analysis with a best-fitting PDF plot.

A user may issue a query via user interface 30 to obtain reports 18 from report generator 26. A user may also make a request using user interface 30 to obtain raw data from database 22 to for performing additional statistical analysis of the data. For example, the user may copy the raw data from database 22 and paste the data into a statistical software application.

Specification adjustment module 42 adjusts the specification when the DPO of the data is zero. Control limit determination module 44 generates samples of data based on parameters input by a user via user interface 30. Based on the samples, control limit determination module 44 calculates an appropriate lower control limit (LCL) and upper control limit (UCL) that fit the parameters. Control limit determination module 44 typically operates after PDF fitting module 32 selects the best-fitting PDF for the data.

Figure 3:
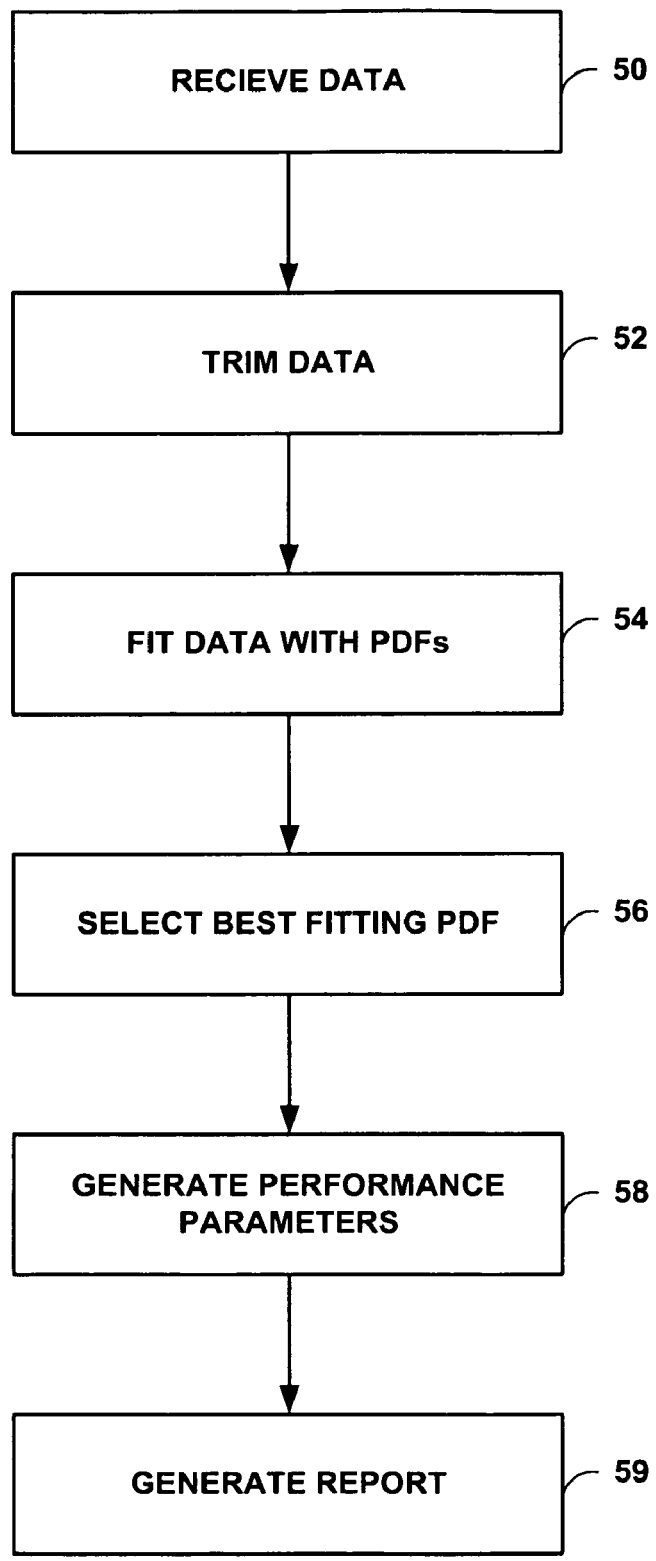
FIG. 3 is a flowchart illustrating example operation of the data analysis system.

FIG. 3 is a flowchart illustrating example operation of data analysis system 12. FIG. 3 illustrates an overview of the operations of data analysis system 12 for analyzing variable data. Data analysis system 12 receives variable data from manufacturing floor 14 using data acquisition module 20 (50). As one example, the collected data may be product testing data. Data acquisition module 20 saves the data to database 22. Instead of assuming that the data follows a normal distribution, data analysis system 12 determines whether the data is a mixed population, and fits the data with a variety of PDFs to determine the best fitting PDF. In this manner, data analysis system 12 may more accurately report product performance.

If the data appears to be mixed population data, trimming module 28 trims the data into main distribution, upper tail, and lower tail sections, based on input from a user via user interface 30 (52). Data analysis system 12 fits the main distribution data with a plurality of PDFs stored in PDF repository 34 using PDF fitting module 32 (54), and selects the best fitting PDF based on statistical characteristics calculated for each PDF (56). Data analysis system 12 generates performance parameters for the tested product (58). Data analysis system 12 may then use report generator 26 to output a report illustrating the performance parameters (59). The operations of each of the modules in performing the steps above will be described in further detail with respect to FIGS. 4A-4D.

Data analysis system 12 may generate a PDF as described above (also referred to as a "baseline PDF") based on, for example, the latest 10,000 samples of the Z-score data pool, with the data set representing long term data. The baseline PDF may be based on Pass drives, or on All drives (ie., Pass and Fail drives). Data analysis system 12 may not generate baseline PDF for individual equipment lines for clean-room operations. Data analysis system 12 may automatically generate a baseline PDF in certain circumstances, such as upon activation of a new CTQ parameter, or at a given interval, such as every 4 weeks from the last system change. When automatically generating a baseline PDF, data analysis system 12 may use default parameters, such as $ARL_{ic}=370.4$, critical mean shift=2, and 2 tails for the control limit.

Figure 4A:
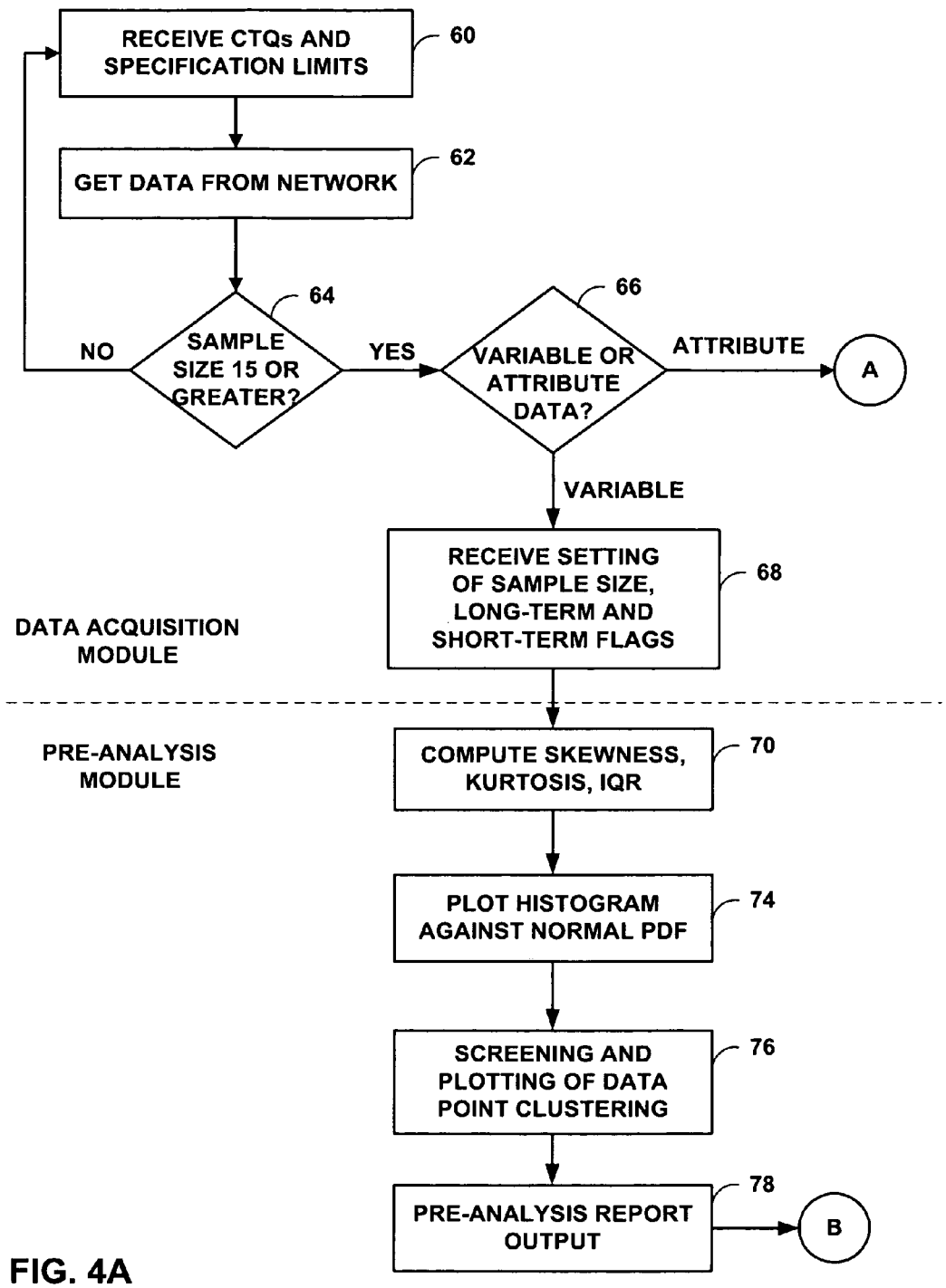
FIG. 4A-4D are flowcharts illustrating operation of the data analysis system in further detail.

FIG. 4A-4D are flowcharts illustrating example operation of data analysis system 12 in analyzing raw data to obtain a process capability Z-score for each critical to quality (CTQ) parameter for a product. FIG. 4A illustrates operation of data acquisition module 20 and pre-analysis module 24 of data analysis system 12. Data acquisition module 20 obtains CTQ parameters and specification limits for a product (60). The specification limits are the upper specification limit (USL) and the lower specification limit (LSL). Data acquisition module 20 may obtain these parameters and limits from database 22, or a user may enter the parameters and limits via user interface 30. In the case of the parameters and limits being entered by the user, data acquisition module 20 may save the parameters and limits to database 22. Data acquisition module 20 also obtains data about a product or component from a network (62). The data may be real-time data received from manufacturing floor 14 (FIG. 1) via the network.

Data acquisition module 20 determines whether the sample size of the received data is fifteen or greater (64). If the sample size is less then fifteen, data acquisition module 20 waits until more data is acquired before proceeding. If the sample size is fifteen or greater, data acquisition module 20 determines the data type, e.g., whether the data is variable or attribute data (66). Data acquisition module 20 may determine the type of data based on the data format, or a user may determine the data type and provide the data type to data analysis system 12 via user interface 30. For example, variable data may be continuous numerical data, while attribute data is either numerical or logical (e.g., Pass/Fail, Good/Bad, 0/1). In the case of attribute data, the user may define a level that represents a "Passed" condition. When the data is attribute data, the process branches to operation 124 of FIG. 4D. When the data is variable data, data acquisition module 20 obtains the sample size n and settings that specify whether the data is long-term or short-term data, as indicated by flags set by a user (68).

Pre-analysis module 24 computes skewness, kurtosis, and inter-quartile range (IQR) (70). Skewness describes the lack of symmetry of a data distribution, and is calculated according to the following formula:

$$\text{Skewness} = \frac{n}{(n-1)(n-2)} \frac{\sum_{i=1}^{n}(x_i - \bar{x})^3}{s^3}, \quad (10)$$

where n is the sample size. Kurtosis describes the extent to which a distribution is peaked or flat, and is calculated according to the following formula:

$$\text{Kurtosis} = \left\{ \frac{n(n+1)}{(n-1)(n-2)(n-3)} \frac{\sum_{i=1}^{n}(x_i - \bar{x})^4}{s^4} \right\} - \frac{3(n-1)^2}{(n-2)(n-3)}. \quad (11)$$

Inter-quartile range describes the spread of or dispersion within a data set, and is calculated by taking the difference between the first and third quartile values. Pre-analysis module 24 plots a histogram of the data against a normal probability density function (74). Pre-analysis module 24 also screens and plots data point clustering (76). Pre-analysis module 24 may do this by plotting the frequency count of the data versus the value in the x-axis, i.e., a "clustering plot." When there are high values, or spikes, in the plot, this may suggest to the user that there is a need to trim the data on the tail end due to saturation conditions or binning set in the test code. Pre-analysis module 24 sends a pre-analysis report output to report generator 26 (78). Data analysis system 12 proceeds to operation 80 of FIG. 4B.

Figure 4B:
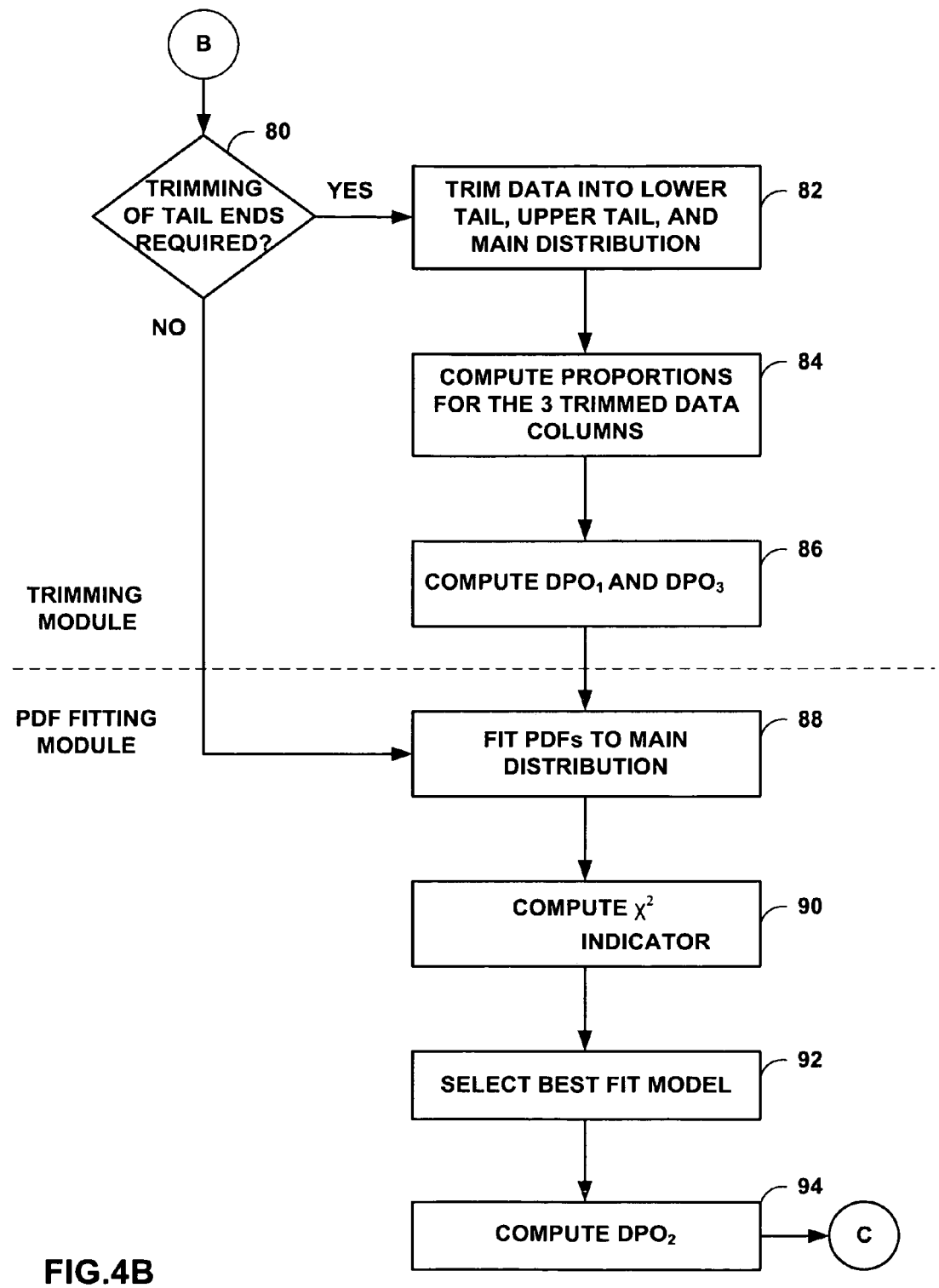

FIG. 4B illustrates example operation of trimming module 28 and PDF fitting module 32 of data analysis system 12. When the data being analyzed represents a mixed data population, i.e., different sections of the data are represented by different distributions, trimming module 28 determines that tail ends must be trimmed (80). Alternatively, a user determines this, and trimming module 28 receives this input via user interface 30. Trimming module 28 allows a user to select appropriate trimming limits via user interface 30 for trimming a data column into separate sections; alternatively, trimming module 28 may automatically select trimming limits when the data contains different data distributions. Trimming module 28 trims the data into main distribution, upper tail, and lower tail sections based on the trimming limits (82). Trimming module 28 determines the proportions of each of the lower tail, main distribution, and upper tail sections compared to the entire distribution (84). These proportions are denoted by $P_1$, $P_2$, and $P_3$, respectively. Trimming module 28 computes the defects per opportunity (DPO) rate for the lower tail and upper tail, denoted by $DPO_1$ and $DPO_3$, respectively (86). When the data is not a mixed data population, i.e., the data may be represented by a single distribution function, trimming module 28 determines that the tail ends need not be trimmed (80). In this case, the process may proceed directly to operation 88 performed by PDF fitting module 32.

Where the tail ends were trimmed, PDF fitting module 32 fits the main distribution data with a plurality of probability distribution functions stored within PDF repository 34, such as those described above with respect to FIG. 2 (88). Where the tail ends were not trimmed, PDF fitting module 32 fits the entire data set. PDF fitting module 32 may make some offset adjustments to the data as needed to perform the fittings. For example, the Box-Cox transformation using $\lambda=-1$ does not allow negative x values. In this case, the data is shifted such that all the data points are positive numbers.

PDF fitting module 32 calculates a $\chi^2$ goodness-of-fit indicator for each of the fitted PDFs (90). The $\chi^2$ goodness-of-fit indicator is a measure of how close an observed DPO, based on the fitted distribution, is to the actual DPO exhibited by the data. PDF fitting module 32 calculates the $\chi^2$ indicator according to the following formula:

$$\chi^2 = \frac{(ActualDPO_1 - ObservedDPO_1)^2}{ActualDPO_1} + \frac{(ActualDPO_3 - ObservedDPO_3)^2}{ActualDPO_3}, \quad (12)$$

where a smaller value of $\chi^2$ indicates a better fit. PDF fitting module 32 determines the best fit by combining two indicators: a validity rating, and a $\chi^2$ goodness-of-fit. Validity rating is a logical segregation of how likely it is that the dataset belongs to a given distribution, using statistical indicators, such as a p-value of a proportion test, skewness, and kurtosis. The validity rating system has three values: 1, 10, and 10,000, which indicate very likely, maybe, and unlikely, respectively. For the proportion test, the approximated DPO from each distribution based on the adjusted specification for LSL and USL are compared against the actual DPO using the proportion test. Those distributions with a p-value of greater than 0.05 for both USL and LSL are given a validity rating of 1; otherwise, the validity rating is set to 10,000.

Skewness may be used to assess the need for a power transformation, which makes the distribution more symmetrical. When the absolute value of the skewness of the distribution before transformation is less than 0.2 or less than the value of the skewness of the distribution after transformation, the validity rating is set to 10 when the p-value for the proportion test is greater than 0.05, and the validity rating is set to 10,000 when the p-value for proportion test is less than 0.05.

Kurtosis may be used to assess whether the Laplace distribution is a suitable fit. The Laplace distribution is given a validity rating of 1 when the kurtosis is greater than 1 and the distribution passes the proportion test. Otherwise, the Laplace distribution is given a validity rating of 10,000. Both skewness and kurtosis may be used to determine whether the normal distribution is a suitable fit. The validity rating for the normal distribution is set to one when the absolute value of the skewness is less than one, the absolute value of the kurtosis is less than three, and the p-value is greater than 0.05. PDF fitting module 32 calculates the best fit by multiplying the validity rating by the $\chi^2$ value. PDF fitting module 32 selects the best fitting PDF based on which PDF has the lowest product of validity rating and $\chi^2$ (92). PDF fitting module 32 calculates defects per opportunity for the main distribution, $DPO_2$, based on the best-fitting PDF (94). Data analysis system 12 proceeds to operation 100 of FIG. 4C.

Figure 4C:
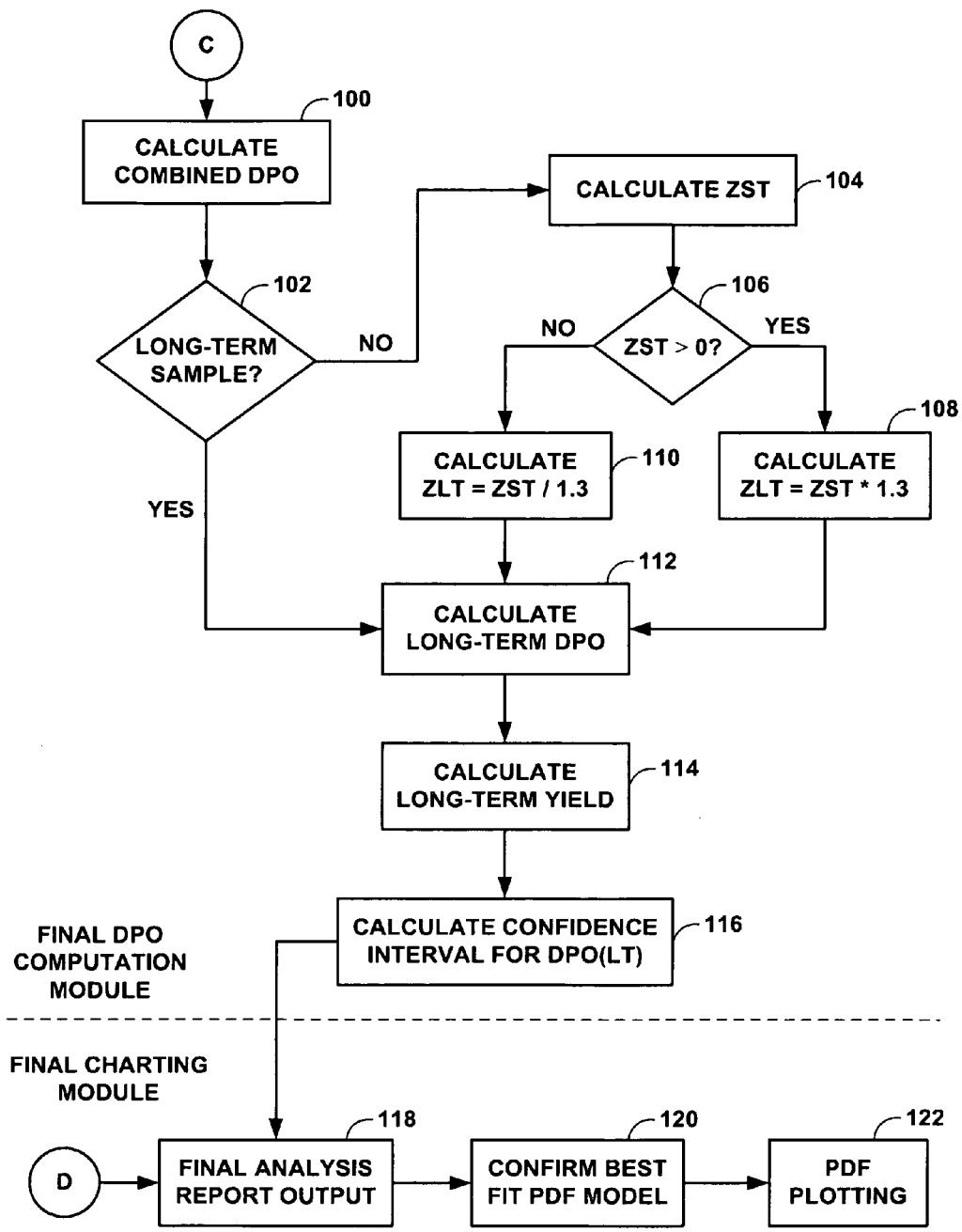

FIG. 4C illustrates example operation of final DPO computation module 36 and final charting module 40 of data analysis system 12. In the case of mixed distribution data, i.e., a trimmed data set, final DPO computation module 36 computes the overall Z-score, DPO, and probability of non-compliance (PNC) by combining the trimmed lower and upper tails with the best fit pdf. PNC is defined as the total area under the PDF curve that is outside of the specification limits. Final DPO computation module 36 calculates the combined DPO for the entire data set (100) based on the following formula:

$$DPO(\text{mixed}) = P_1 * DPO_1 + P_2 * DPO_2 + P_3 * DPO_3. \quad (13)$$

This step combines the trimmed lower and upper tails with the best fit PDF to compute an overall DPO. Final DPO computation module 36 determines whether the data sample is a long-term sample based on flags obtained by data acquisition module 20 (102). If so, final DPO computation module 36 proceeds directly to determining the long-term DPO (112). If not, final DPO computation module 36 determines a short-term Z-score ($Z_{ST}$) (104) according to the following formula:

$$Z_{ST}=NormSinv(1-DPO(\text{mixed})). \quad (14)$$

If $Z_{ST}$ is greater than zero (106), final DPO computation module 36 multiplies $Z_{ST}$ by 1.3 to obtain $Z_{LT}$ (108). If $Z_{ST}$ is not greater than zero (106), final DPO computation module 36 divides $Z_{ST}$ by 1.3 to obtain $Z_{LT}$ (110). Final DPO computation module 36 determines the long-term DPO (112) according to the following formula:

$$DPO(LT)=1-NormSDist(Z_{LT}). \quad (15)$$

Final DPO computation module 36 calculates the long-term yield (114) according to the following formula:

$$\text{Yield}(LT)=BinomDist(x,m,p,1). \quad (16)$$

In the case of multiple defects per opportunity per unit, i.e., m>1, final DPO computation module 36 also computes the long-term yield and its 95% confidence interval (116) according to the following formula:

$$CI = DPO(LT) \pm 1.96\sqrt{\frac{DPO(LT)*(1-DPO(LT))}{n}}. \quad (17)$$

Final charting module 40 sends a final analysis report to report generator 26 (118), and provides the user an opportunity to confirm the best-fit PDF model, or to override the PDF fitting module's selection of the best-fitting PDF model by re-ranking the fit order if after examining the distribution behavior the user believes that a different PDF model better fits the data (120). Final charting module 40 plots the best-fit PDF (122).

Figure 4D:
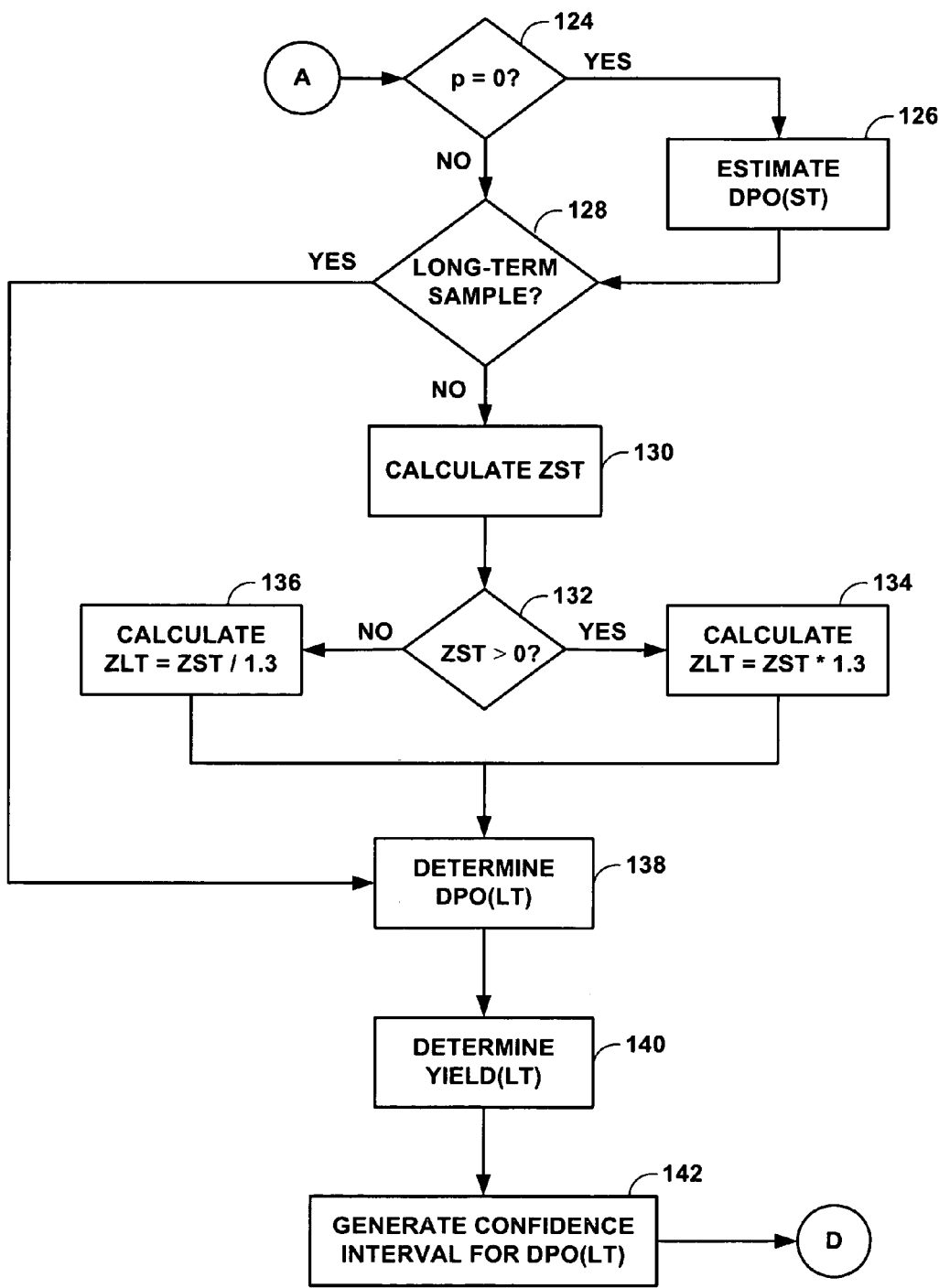

FIG. 4D is a flow chart illustrating example operation of attribute data module 38 of data analysis system 12 in analyzing attribute data to determine a rate of long-term defects per opportunity (DPO). The DPO is represented by the variable p. When data acquisition module 20 determines that the data is attribute data (66, FIG. 4A), attribute data module 38 checks whether p=0 (124). If p=0, attribute data module 38 estimates a short-term DPO according to the following formula:

$$DPO(ST) = 1 - \left(\frac{mn - \frac{1}{3}}{mn + \frac{1}{3}}\right), \quad (18)$$

where n is the number of units inspected, and m is opportunities per unit (126). Attribute data module 38 then determines whether the sample is a long-term sample (128). If p≠0 (124), attribute data module 38 proceeds directly to operation 128.

When the sample is a long-term sample, attribute data module 38 proceeds directly to operation 138. When the sample is not a long-term sample, attribute data module 38 calculates $Z_{ST}$ (130) according to the following formula:

$$Z_{ST}=NormSinv(1-DPO(ST)). \quad (19)$$

If $Z_{ST}$ is greater than zero (132), attribute data module 38 multiplies $Z_{ST}$ by 1.3 to obtain $Z_{LT}$ (134). If $Z_{ST}$ is not greater than zero (132), attribute data module 38 divides $Z_{ST}$ by 1.3 to obtain $Z_{LT}$ (136). Attribute data module 38 determines the long-term DPO (138) according to equation 15 above.

Attribute data module 38 calculates the long-term yield according to equation 16 above (140). In the case of multiple defects per opportunity per unit, i.e., m>1, attribute data module 38 also computes the long-term yield and its 95% confidence interval according to equation 17 above (142). Control then proceeds to final charting module 40, which performs operation 118 of FIG. 4C.

Figure 5:
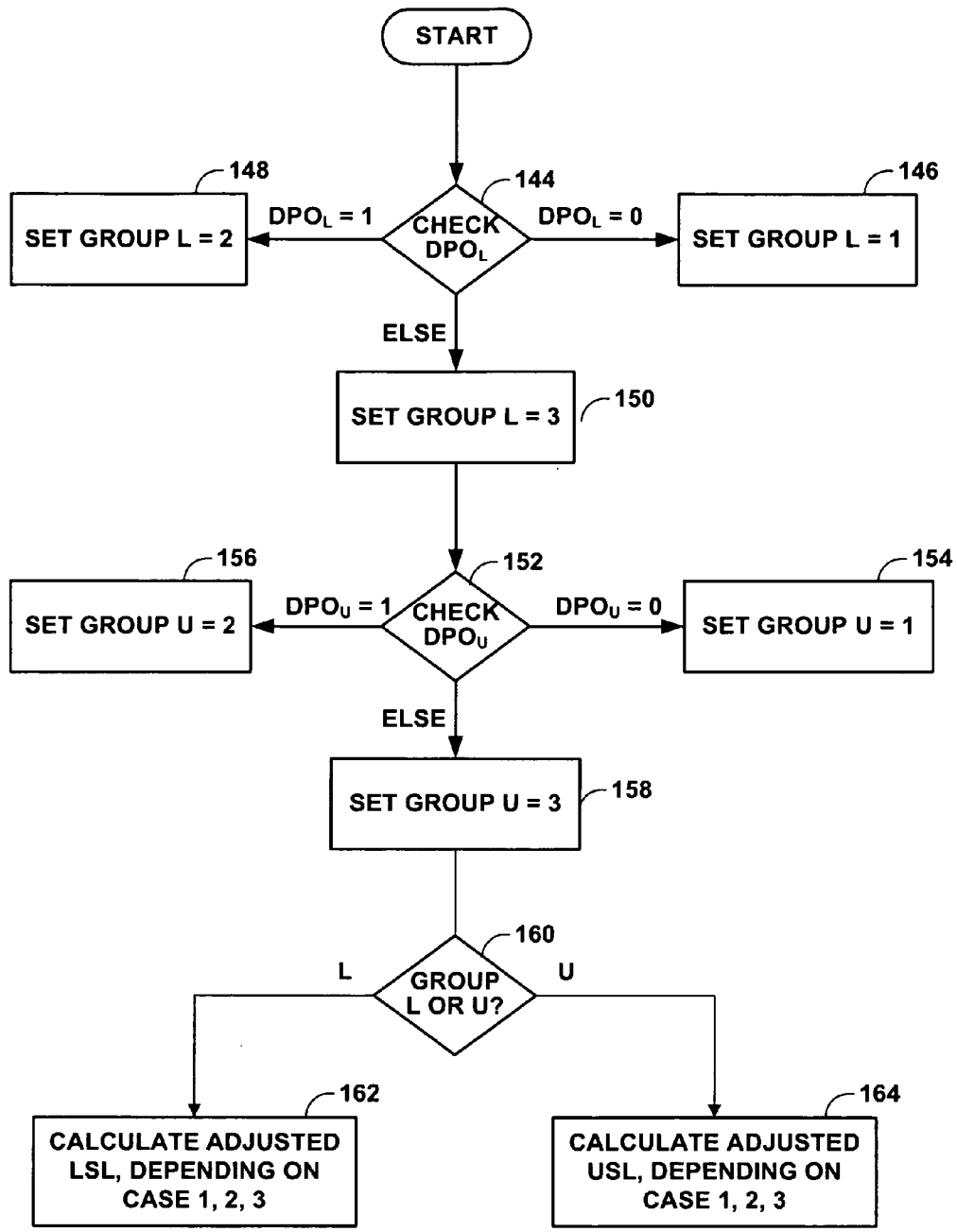
FIG. 5 is a flowchart illustrating example operation of the data analysis system in adjusting specification limits.

FIG. 5 is a flowchart illustrating example operation of specification adjustment module 42 of data analysis system 12. As discussed above, data analysis system 12 assesses which PDF best fits the data by comparing the actual defects per opportunity (DPO) from the data with an estimated DPO from each fitted distribution. However, where a tested sample is small, the DPO for the sample is very likely to be zero, which may make this comparison unreliable. To address this, data analysis system 12 implements a routine to adjust the specification limits when the DPO of the data is zero. Specification limits define a range of acceptable product performance.

Specification adjustment module 42 checks $DPO_L$, the DPO for the lower tail region of the data, i.e., data group L (144). If $DPO_L=0$, specification adjustment module 42 sets data group L=1 (146). If $DPO_L=1$, specification adjustment module 42 sets data group L=2 (148). Else, specification adjustment module 42 sets data group L=3 (150). Specification adjustment module 42 also checks $DPO_U$, the DPO for the upper tail region of the data, i.e., data group U (152). If $DPO_U=0$, specification adjustment module 42 sets data group U=1 (154). If $DPO_U=1$, specification adjustment module 42 sets data group U=2 (156). Else, specification adjustment module 42 sets data group U=3 (158).

For data group L (160), specification adjustment module 42 adjusts the specification by calculating an adjusted LSL (162) in the following manner. For L=1, specification adjustment module 42 obtains the value for the 3rd percentile of the data, and also obtains the next higher value. Specification adjustment module 42 calculates the adjusted LSL by averaging these two values. For L=2, specification adjustment module 42 obtains the value for the 97th percentile, and also obtains the next lower value. Specification adjustment module 42 calculates the adjusted LSL by averaging these two values. For L=3, the adjusted LSL equals the original LSL.

For data group U (160), specification adjustment module 42 adjusts the specification by calculating an adjusted USL (164) in the following manner. For U=1, specification adjustment module 42 obtains the value for the 3rd percentile of the data, and also obtains the next higher value. Specification adjustment module 42 calculates the adjusted USL by averaging these two values. For U=2, specification adjustment module 42 obtains the value for the 97th percentile, and also obtains the next lower value. Specification adjustment module 42 calculates the adjusted USL by averaging these two values. For U=3, the adjusted USL equals the original USL. Specification adjustment module 42 outputs the adjusted LSL and USL to PDF fitting module 32 for performing the best fit comparison.

Figure 6:
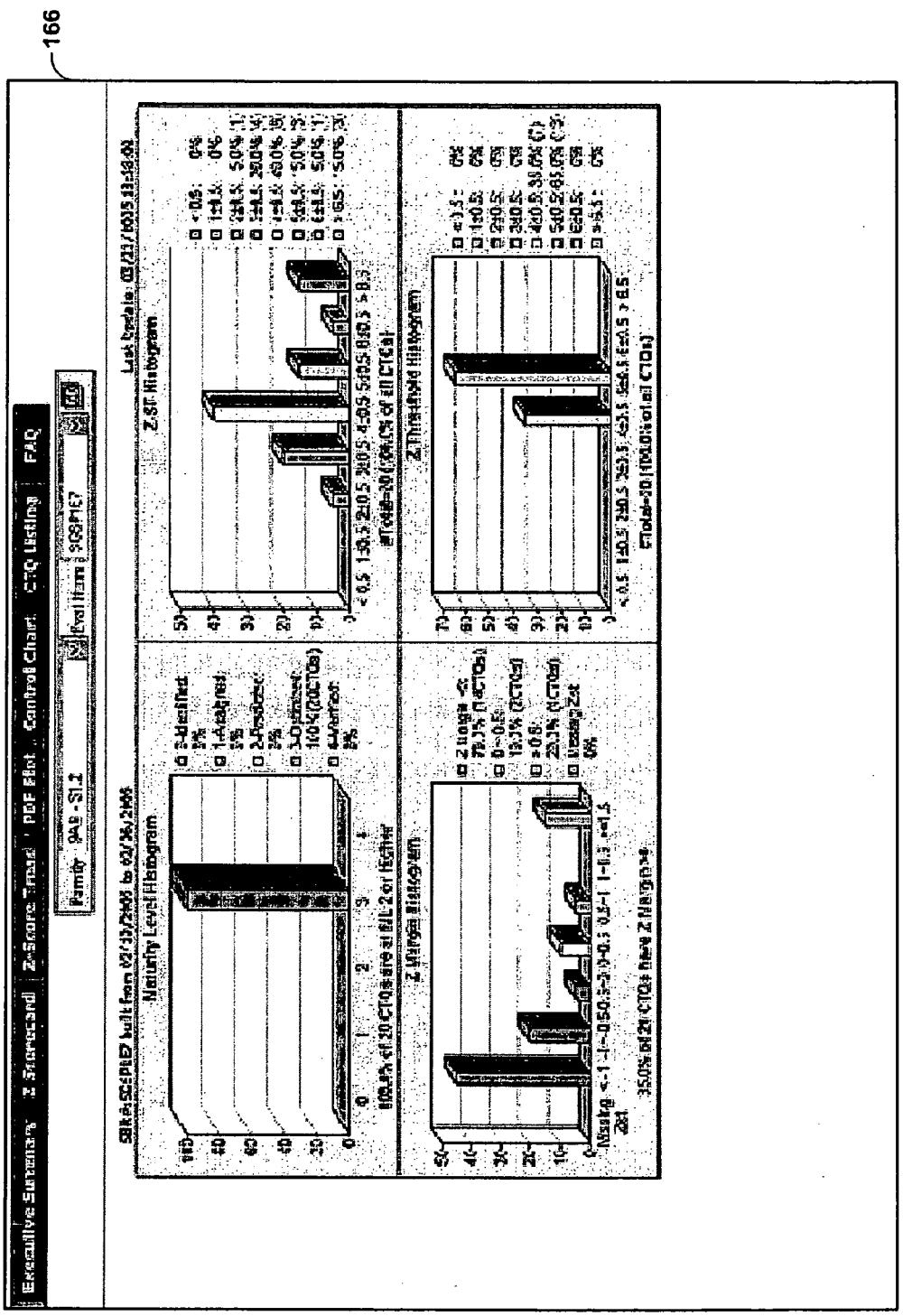

FIG. 6 is an exemplary screen illustration depicting an example report 166 generated by data analysis system 12 as viewed on an interface, such as user interface 30 of FIG. 2. In particular, report 166 represents a sample report in which a user has requested an executive summary for a particular product. The executive summary provides an overall summary of a product. In this manner, the user can view product development and channel resources to work on critical issues.

Figure 7:
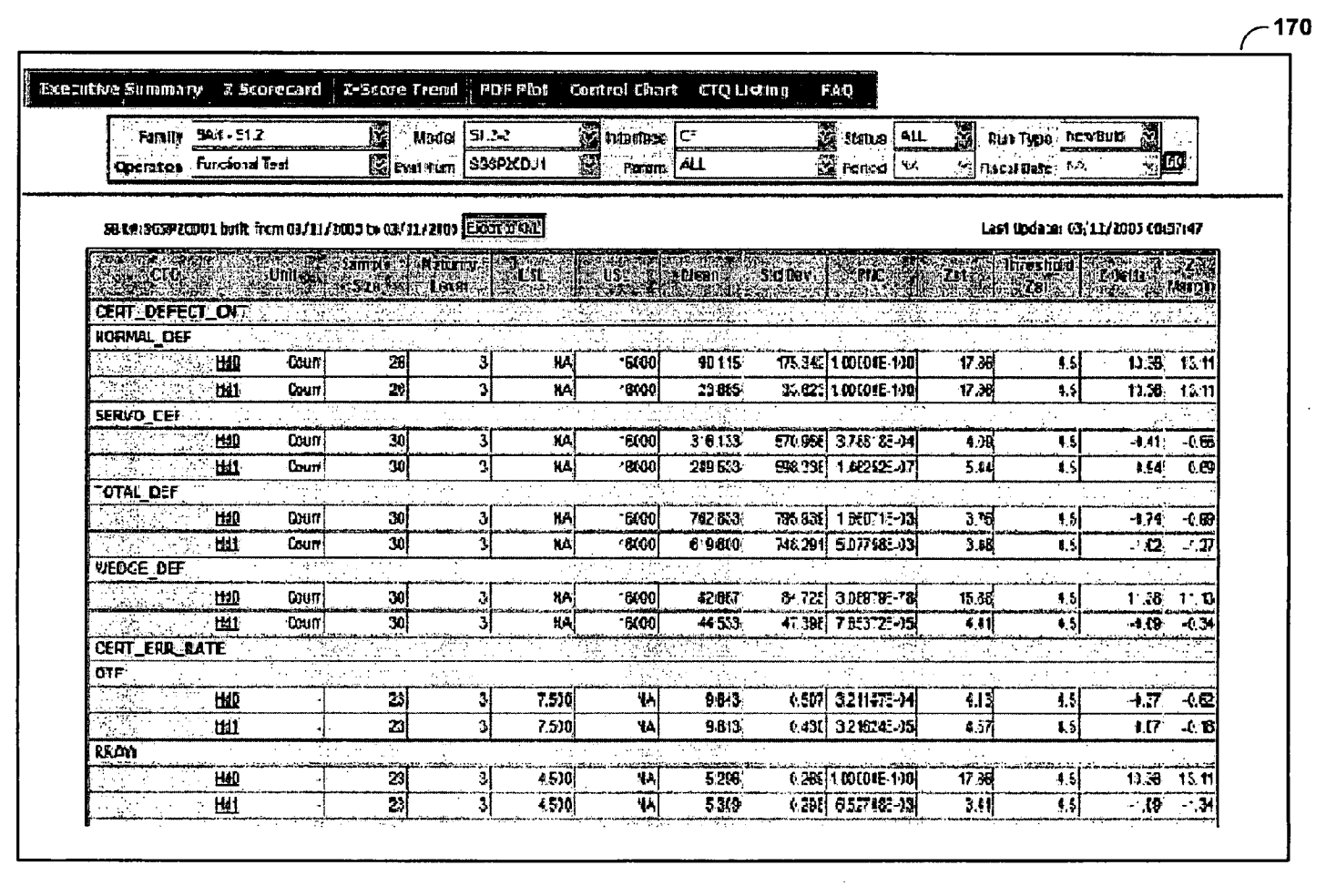

FIG. 7 is an exemplary screen illustration of a report 170 that represents a sample report in which a user has requested a Z scorecard for a particular product. The Z scorecard presents data for a variety of critical to quality (CTQ) parameters for a product. The Z scorecard may be populated automatically and in real-time by data analysis system 12. At various phases of the design cycle, scorecards may be assessed to ensure that a Z-margin of the CTQ parameters, shown in the right column, meets a minimum requirement, with a typical Z-margin requirement set to Z-margin>0. Further design changes may then be made to improve upon those CTQ parameters having an unacceptable Z-margin.

Figure 8:
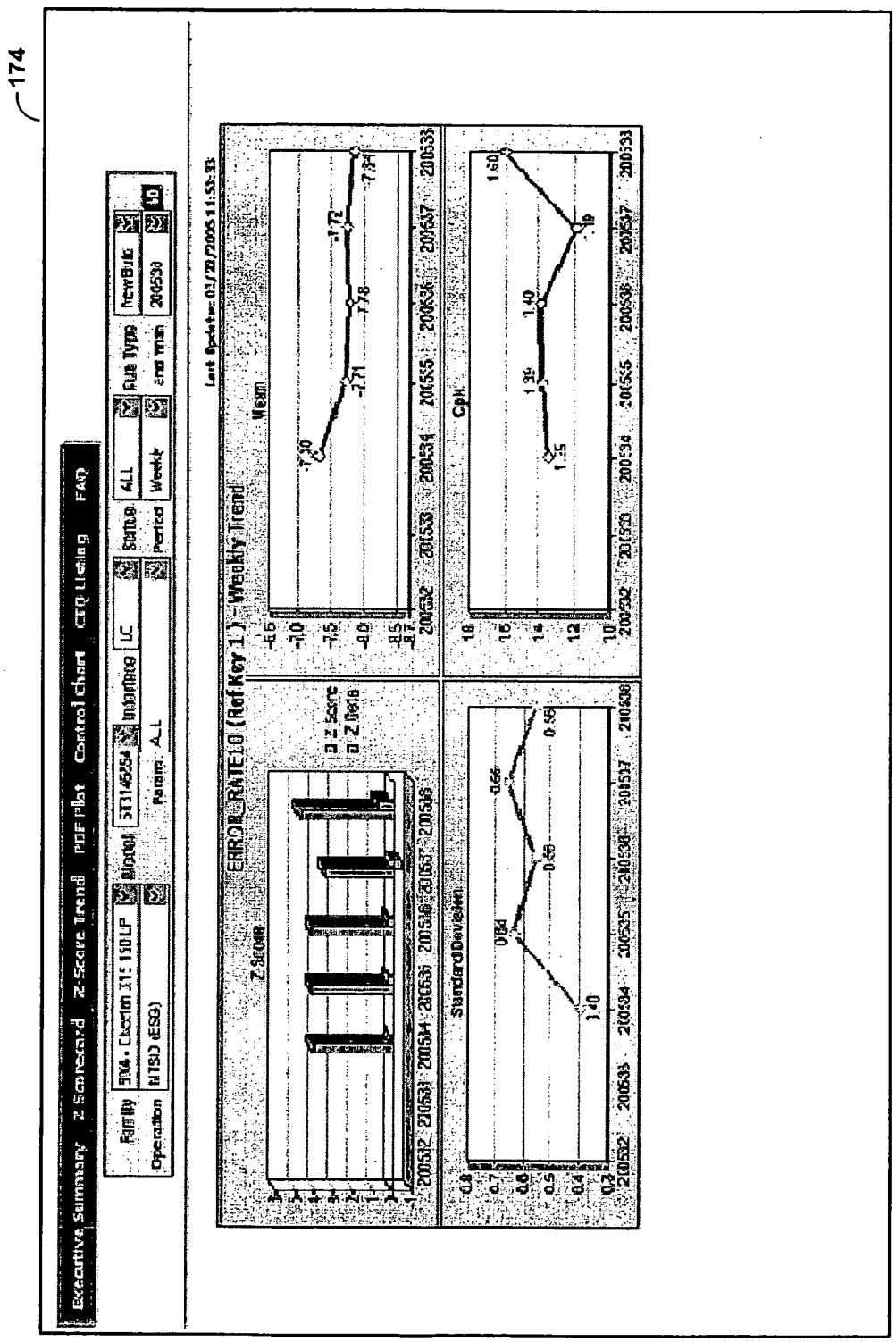

FIG. 8 is an exemplary screen illustration of a report 174 that represents a sample report in which a user has requested a Z-score trend report. The Z-score trend report shows the performance of a CTQ parameter over time. In this manner, the user may observe trends and may observe the effectiveness of design changes in improving a Z-score.

Figure 9:
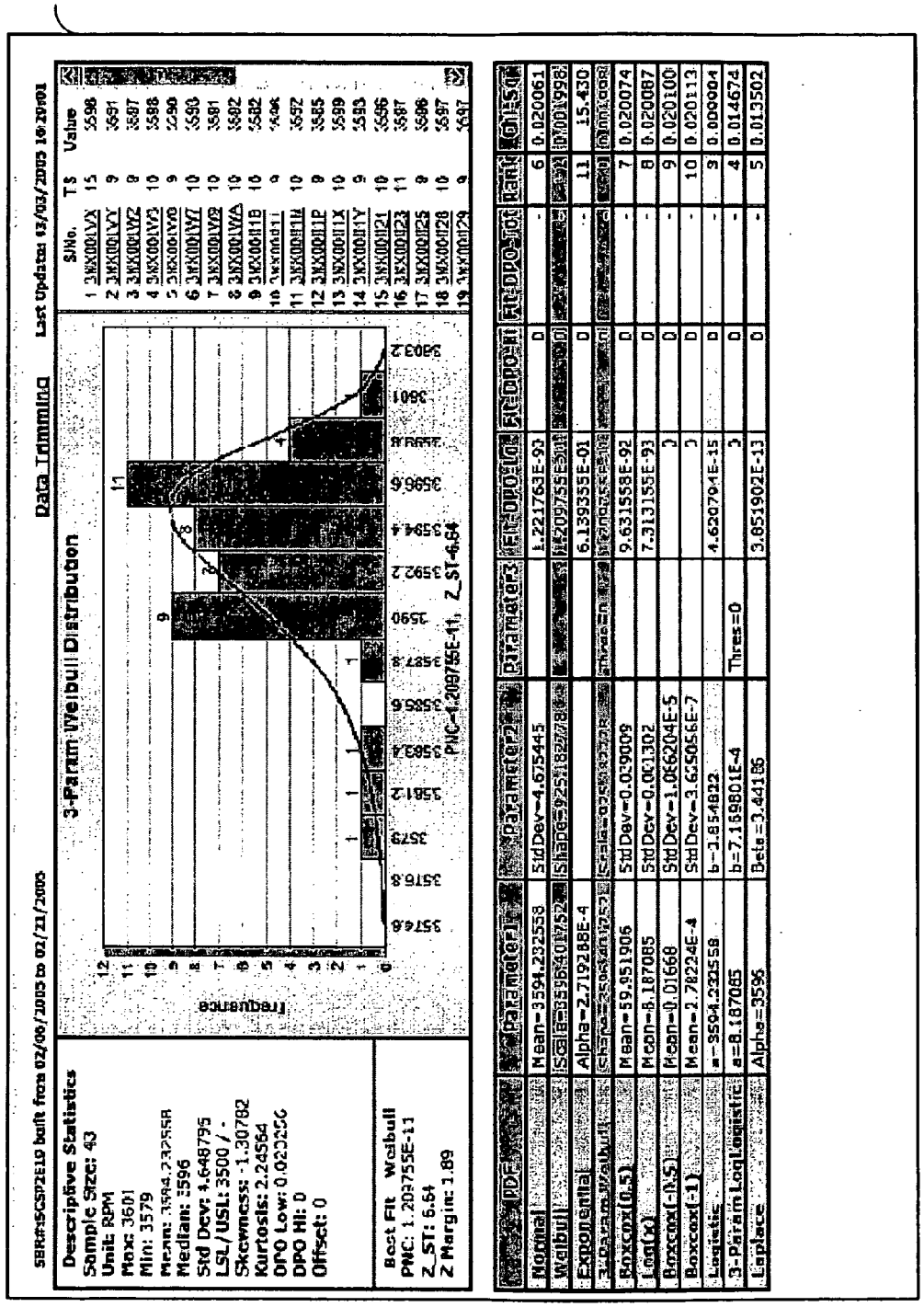

FIG. 9 is an exemplary screen illustration of a report 176 that represents a sample report in which a user has requested a PDF plot report. Report 176 illustrates the PDF that best fits the data, for example, the 3-Parameter Weibull distribution in this case. The PDF plot report also gives parameter information about each of the PDFs that were fitted to the data.

Figure 10:
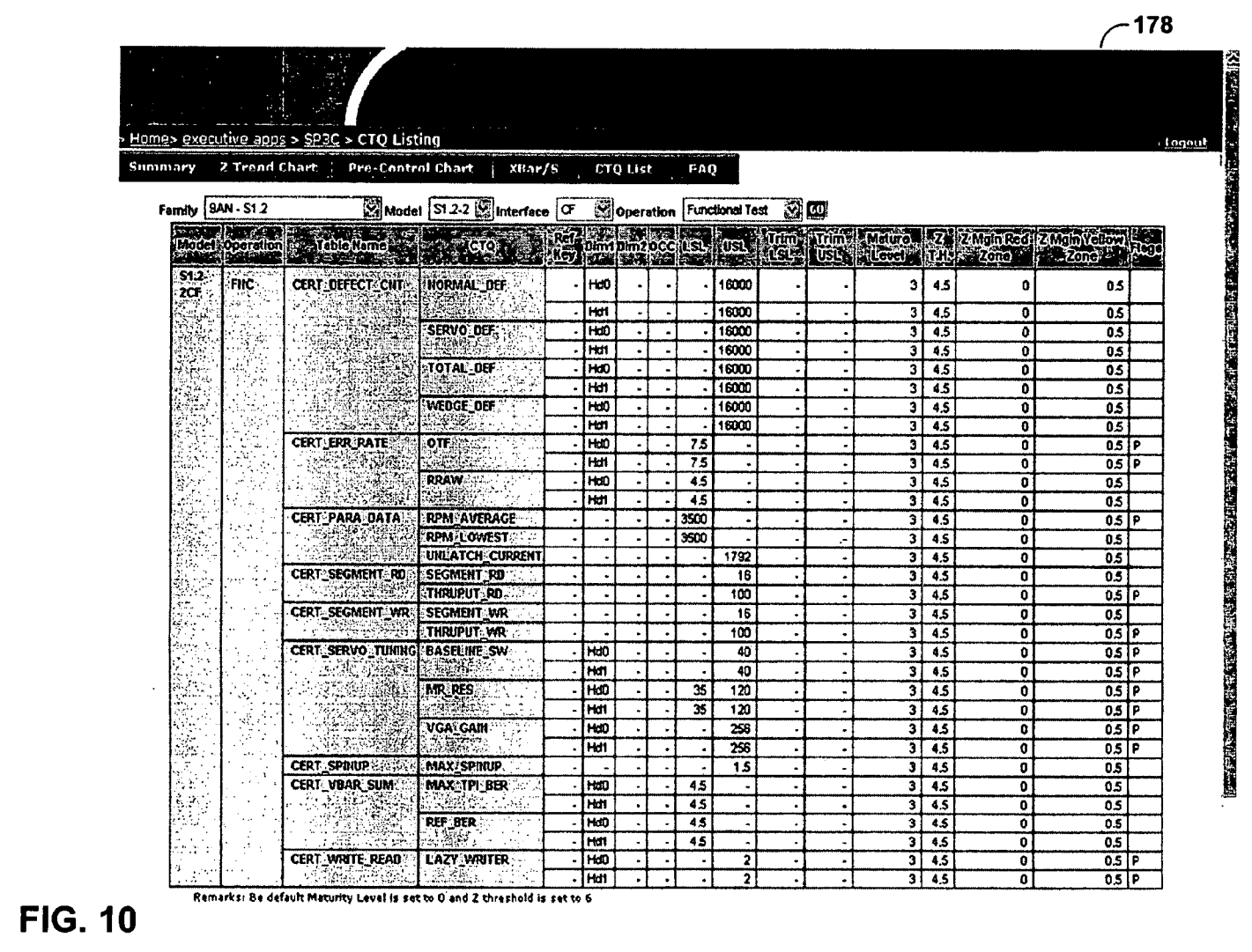

FIG. 10 is an exemplary screen illustration of an example CTQ definition page 178 as viewed on user interface 30. To set up a new product so that data analysis system 12 can pull data and perform the required analysis, the users, typically process engineers, will input information to the CTQ definition page 178. A user will enter data structure parameters, which describe how the test data is stored in database 22 (FIG. 2). These parameters may include the product model, test operation, parametric table name, CTZ name, reference key, and part attribute filter settings, such as Dim1, Dim2, and OCC. The user may also enter test specification limits where the product is considered good and functional, i.e. USL and LSL. The user may also enter the output performance measure parameters, such as Mature Level, $Z_{TH}$, Z-margin Red Zone and Z-margin Yellow Zone. The user may also determine whether the data represents a mixed distribution. In this case, the user may want to investigate into the differences among the distributions and make any necessary improvements to the design, process, or measurements tools before attempting to compute the Z-score. If the mixed distribution nature is inherent in the process, then the user may specify the Trim LSL or Trim USL or both. Other parameters not shown on CTQ definition page 178 may also be used.

CASE STUDY EXAMPLE 1

Figure 11:
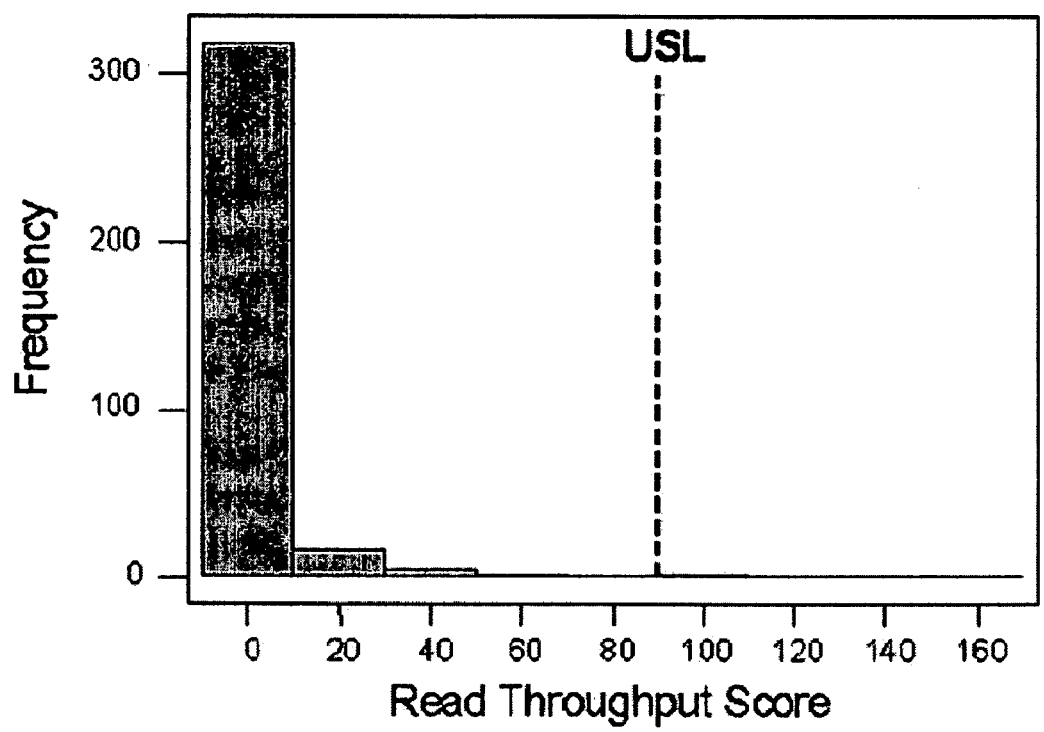
FIG. 11 is a chart illustrating example data used in a case study.

A comparison was performed to demonstrate the improvement in assessment accuracy using data analysis system 12. The case study illustrates the differences between the traditional method of calculation of DPMO and Z-score using a normal approximation, and the treatment by data analysis system 12 of mixed populations. The case study uses example data shown in FIG. 11 that is characteristic of the Read Throughput Score at drive level. As seen in FIG. 11, of the 347 disc drives tested, only 4 were found to exhibit a Read Throughput Score in excess of the USL. In other words, this parameter had an observed defect rate (or PNC) of 11,527.38 dpmo. Using the conventional approach, the mean and standard deviation were determined to be 3.5879 and 15.1981, respectively. For a USL of 80, a normal distribution would have yielded a defect rate (or PNC) of only 0.25 dpmo. The observed defect rate was thus more than 43,378 times higher than expected, under the assumption of normality.

An appropriate method would be to partition the data set into two populations. Population 1: Observations with a Read Throughput Score of 5 or less (316 out of 347, or 91.07% of the data set); Population 2: Observations with a Read Throughput Score of 6 or more (31 out of 347, or 8.93% of the data set). Population 2 was then identified to approximate an exponential distribution with a mean of 37.677 with a defect rate (or PNC) of 0.1196 dpo, while population 1 will not yield any defects. Hence, the defect rate for this mixed distribution is expected to be about 0.9107(0)+0.0893(0.1196)=0.01069 dpo. This is a better approximate against the observed defect rate of 0.01153 dpo.

Table 1 below shows a table of comparison between the traditional method and the proposed method of treating mixed populations. As can be seen, the differences are not just different numbers, but also different actions that impact the whole operation.

TABLE 1

|  | Observed performance | Traditional method (Normal approx.) | Proposed method |
| --- | --- | --- | --- |
| DPMO | 11,530.00 | 0.25 | 10,690.00 |
| Zscore | 3.77 | 6.5 | 3.8 |
| Decision/ Action |  | CTQ performs up to expectation. Do not require effort to improve the CTQ | CTQ does not perform up to expectation. Effort required to improve the CTQ |
| Consequence |  | Manufacturing continues to see defects in this CTQ which is not solved during the development phase. Thus needed more resources to fix the issue. May have quality issue at customer end. | Problem will be fixed at development phase with minimum cost. No impact to quality at customer end. |

Figure 12:
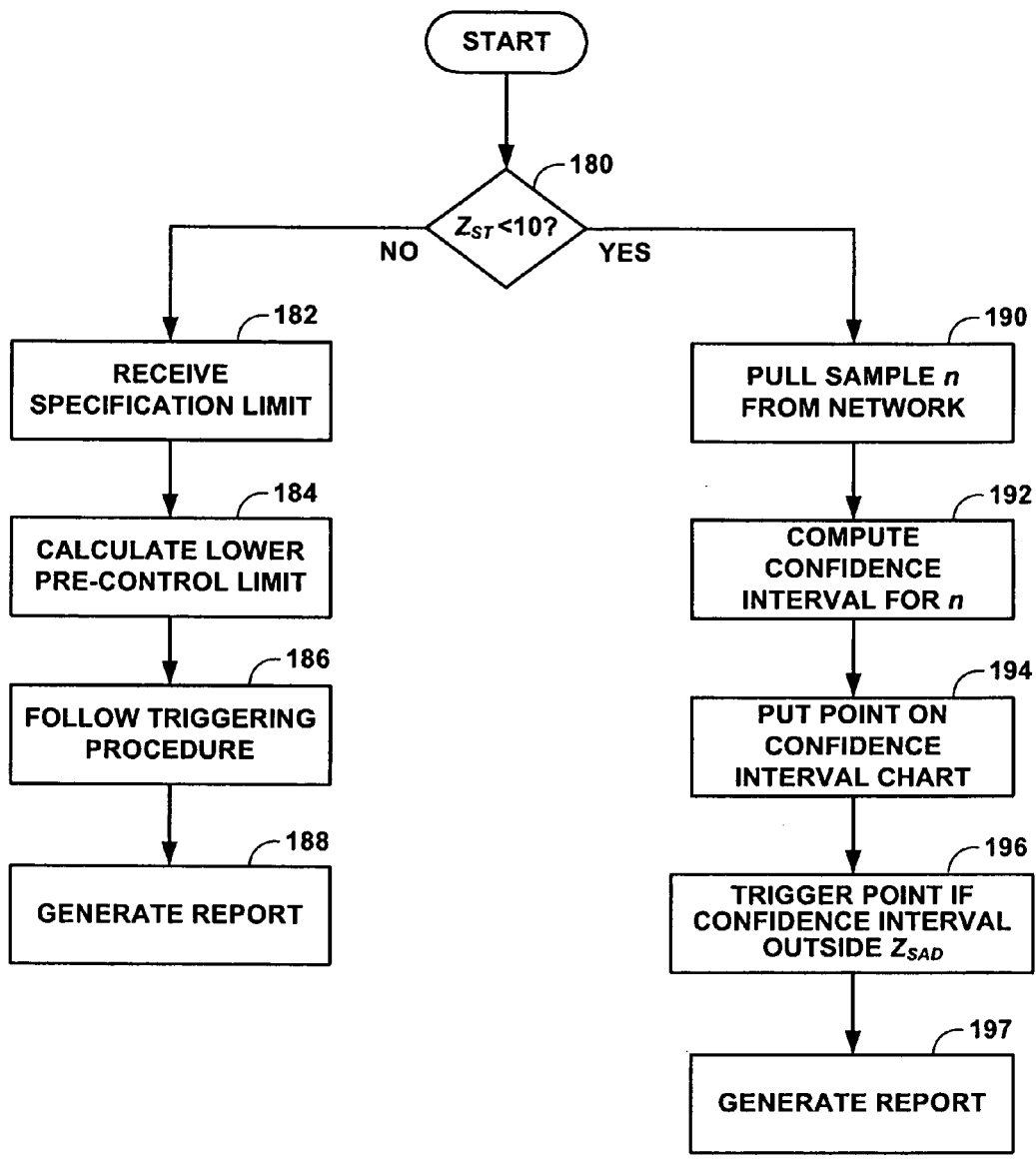
FIG. 12 is a flowchart illustrating example operation of the data analysis system in adjusting control limits.

FIG. 12 is a flowchart illustrating example operation of control limit determination module 44 of data analysis system 12. Data analysis system 12 provides a hybrid system for tracking the capability and performance of each of the CTQ parameters to ensure consistency in the process and quality in shipped products. Control limit determination module 44 uses a hybrid approach consisting of a one-sided pre-control chart for cases where less sensitivity is needed, and a confidence interval control chart for cases where more sensitivity is needed. Where the CTQ performance capability is high, e.g., $Z_{ST} \geq 10$, a sensitive control chart may be inappropriate, since a slight drift in the performance will not cause a defective product. In contrast, where the CTQ performance capability is lower, e.g., $Z_{ST} < 10$, a more sensitive control chart may be appropriate. The use of $Z_{ST}=10$ for this threshold is merely an example; control limit determination module 44 may use a different value of $Z_{ST}$ for this threshold, e.g., $Z_{ST}=6$.

$C_{pk}$ is a measure of the capability of a process, and gives an indication of the quality of the product produced by the process. Since customers may request a $C_{pk}$ parameter for products, data analysis system 12 provides a modified $C_{pk}$ using the following formula:

$$C_{pk} = \frac{Z_{ST}}{3}. \quad (20)$$

Figure 13:
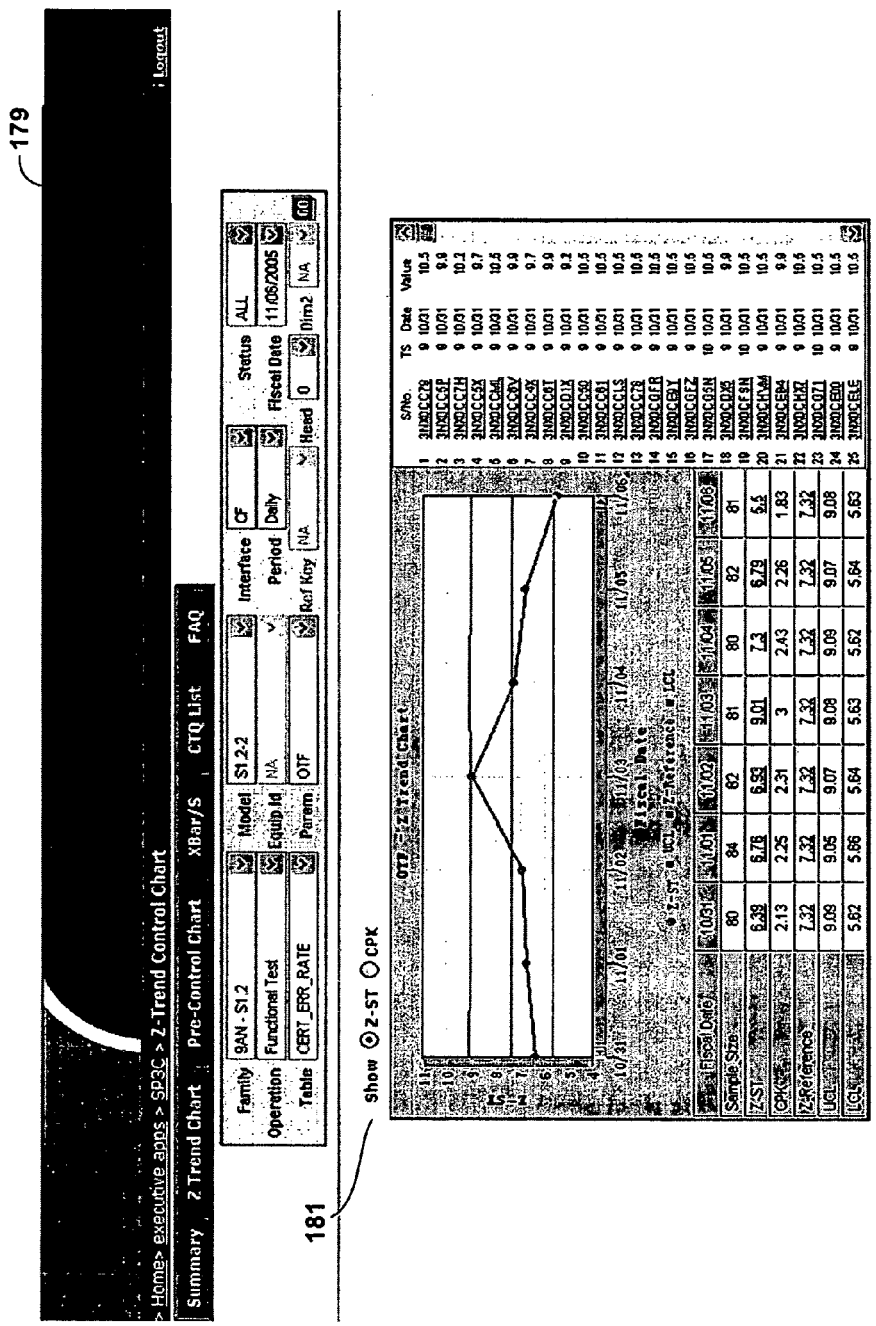
FIG. 13 is an exemplary report generated by the data analysis system as viewed on a user interface.

This modified $C_{pk}$ has a direct relationship with the reject rate. A Z-score chart, such as Z Trend Chart 179 of FIG. 13, can be converted to $C_{pk}$ using this formula, providing the user with the option to toggle between the two versions of the Z-score chart using show select feature 181. FIG. 13 is an exemplary report generated by data analysis system 12 as viewed on user interface 30.

When a process has a CTQ parameter with $Z_{ST} \geq 10$ (no branch of 180, FIG. 12), control limit determination module 44 uses a one-sided pre-control chart. The one-sided pre-control chart is a special type of control chart that uses the specification limits instead of the statistical variation of the process. Control limit determination module 44 either receives a specification limit from a user via user interface 30 or obtains a specification limit from database 22 (182). Control limit determination module 44 then calculates a lower pre-control limit (LPCL) using the specification limit (SL) (184), according to the following formula:

$$LPCL = SL + \frac{(Z_{ST} - SL)}{2}. \quad (21)$$

Control limit determination module 44 then follows the triggering procedure, which involves deciding to trigger based on two points (186). The triggering procedure may call for actions to be taken, such as "continue," "adjust," "contact process owner," and "disposition," depending on whether points fall lower than the specification limit, between the specification limit and the lower pre-control limit, and higher than the lower pre-control limit. For example, "Continue" may mean that the process is stable and no adjustment is needed. "Adjust" many mean that the process owner was contacted and an investigation for process drift was triggered. "Disposition" may refer to the invoking of extra screening tests to safeguard the customer from process irregularities. A given set of locations of outlying trigger points may call for multiple actions.

Figure 14:
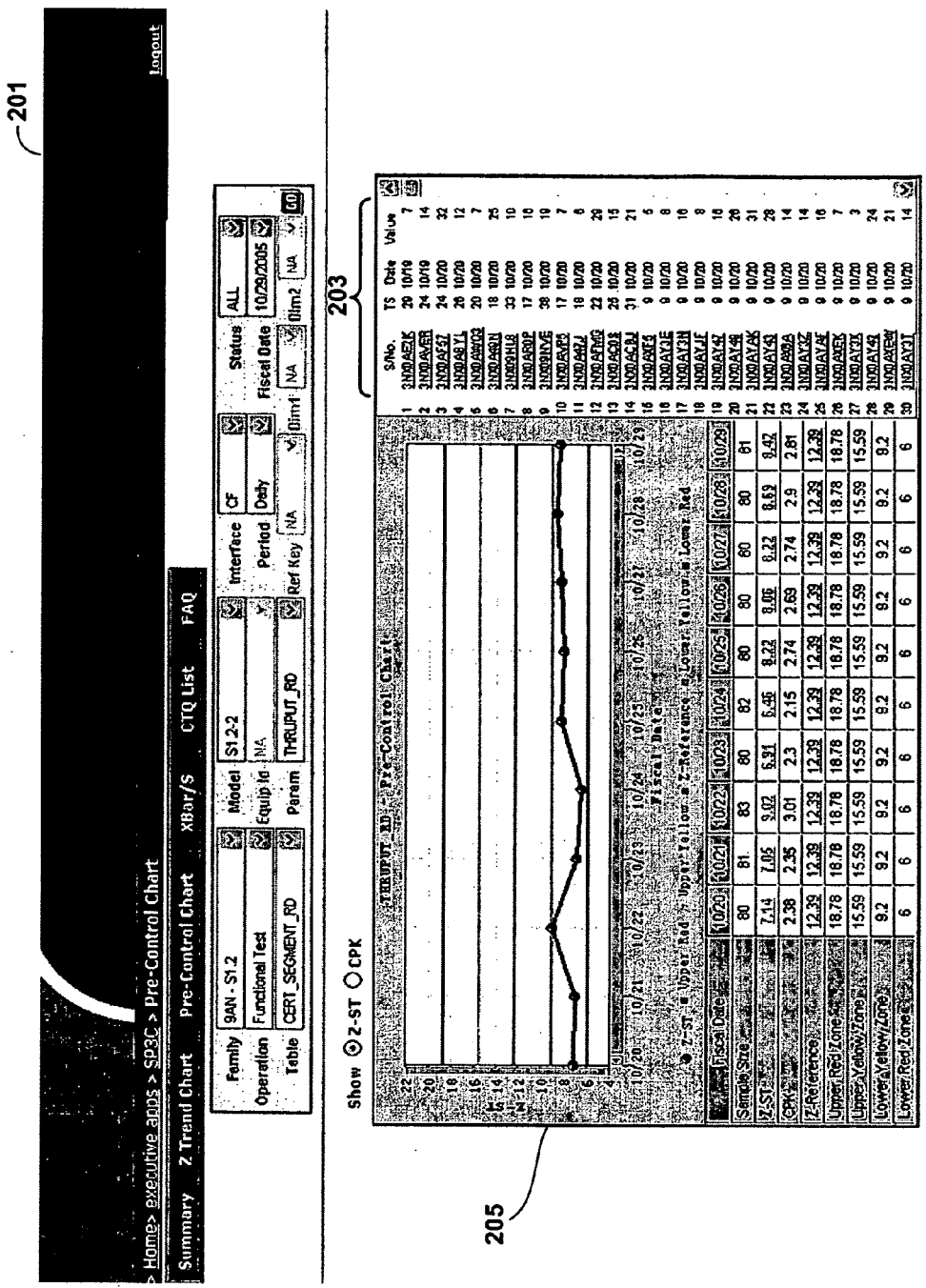
FIG. 14 is an exemplary report generated by the data analysis system as viewed on a user interface.

Control limit determination module may generate a report (188) such as the report 201 of FIG. 14. FIG. 14 illustrates an exemplary report 201 as viewed on a user interface such as user interface 30 of FIG. 2. Report 201 contains a column of raw sample data 203, and a color-coded graphical display 205 for showing trigger status. Points may be color-coded depending on where they fall in relation to the specification limit and the lower pre-control limit. For example, points lower than the specification limit may be classified as "red zone" points, points between the specification limit and the lower pre-control limit may be classified as "yellow zone" points, and points higher than the lower pre-control limit may be classified as "green zone" points.

When a process has a CTQ parameter with $Z_{ST}<10$ (yes branch of 180, FIG. 12), control limit determination module 44 may use a confidence interval control chart method. The concept of a confidence interval is that when a small sample is taken from a data population, the measured performance characteristic may not represent the actual performance. The confidence interval is a $(1-\alpha)\%$ interval around the measured performance, where $\alpha$ is the tolerable risk that the actual performance is not within the confidence interval. As a result, a system provides $(1-\alpha)\%$ confidence that the actual performance is within the confidence interval, and only triggers if the confidence interval is outside the expected performance, i.e., the Z-score during the Ship Approval Document (SAD) ($Z_{SAD}$), which is a step in releasing a product from qualification phase to volume production phase.

Control limit determination module 44 pulls a sample of size n from the network using data acquisition module 20 (190). Control limit determination module 44 computes the confidence interval based on the following equations (192):

$$Z_{ST}(LowerConfidenceLevel) = \sqrt{\frac{\chi^2_{\alpha,n-1}}{n-1}} \times Z_{SAD} \quad (22)$$

$$Z_{ST}(UpperConfidenceLevel) = \sqrt{\frac{\chi^2_{(1-\alpha),n-1}}{n-1}} \times Z_{SAD}. \quad (23)$$

Figure 15:
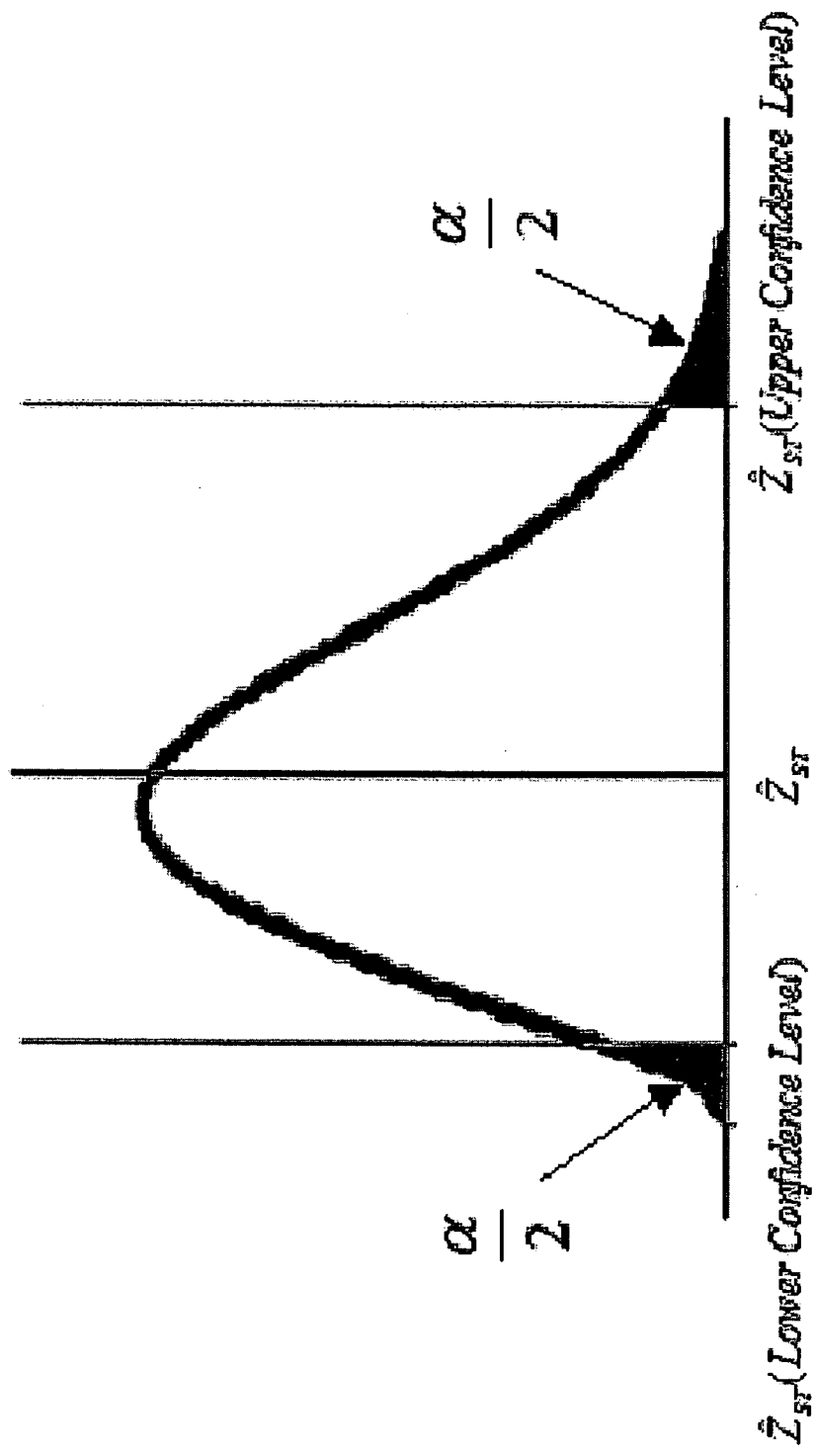
FIG. 15 is a graph illustrating an example Z-score distribution.
Figure 16:
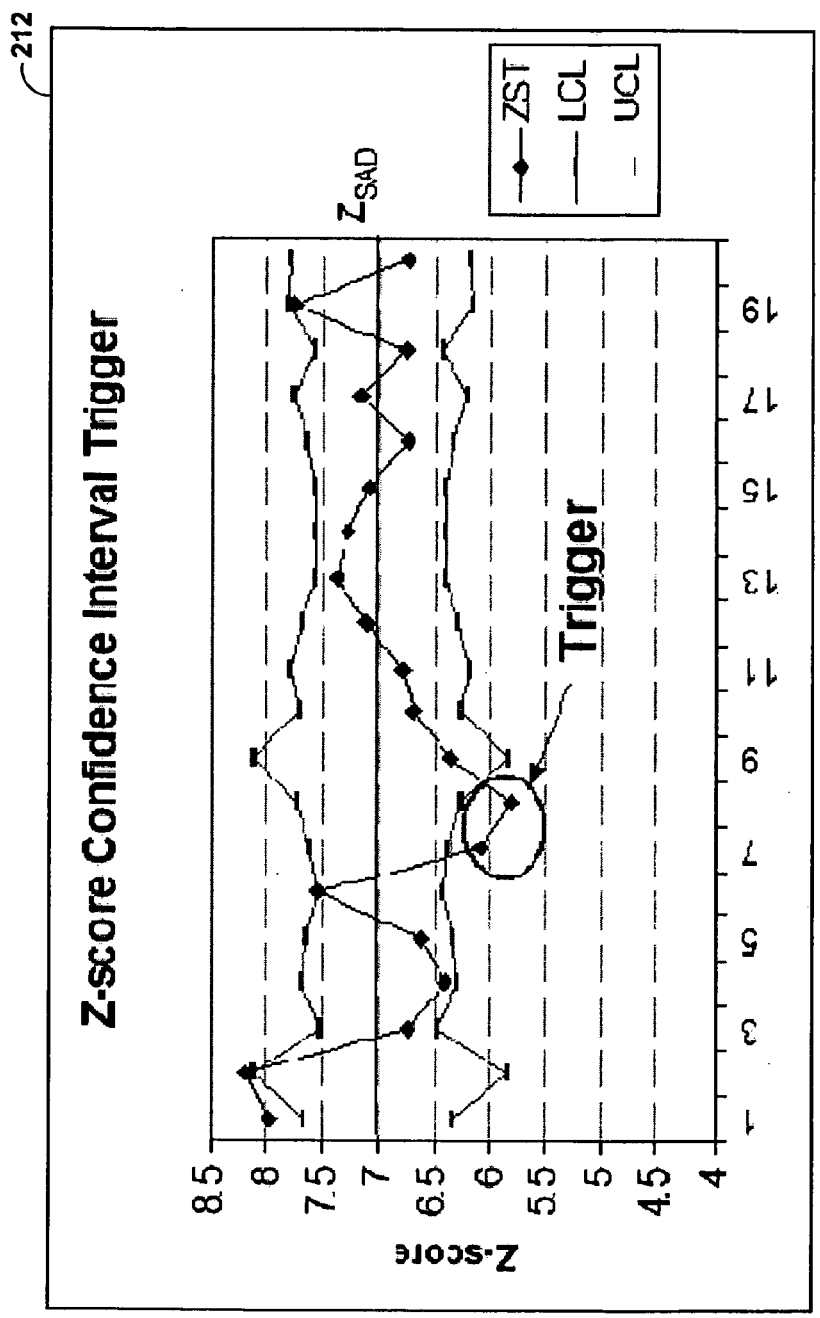
FIG. 16 is a graph illustrating an example confidence interval control chart used for adjusting control limits.

FIG. 15 is a graph illustrating an example Z-score distribution. The upper confidence level and lower confidence level lines are located on either sized of $Z_{ST}$. As can be seen in FIG. 15, the Z-score follows the $\chi^2$ distribution. Control limit determination module 44 then puts a point on a confidence interval chart (194), and triggers the point if the entire confidence interval is outside of the $Z_{SAD}$ (196). Control limit determination module 44 may generate a report (197) that contains a confidence interval control chart such as the example confidence interval control chart 212 illustrated in FIG. 16. In the example of FIG. 16, certain points that fall outside the lower confidence level (LCL) are triggered.

Figure 17:
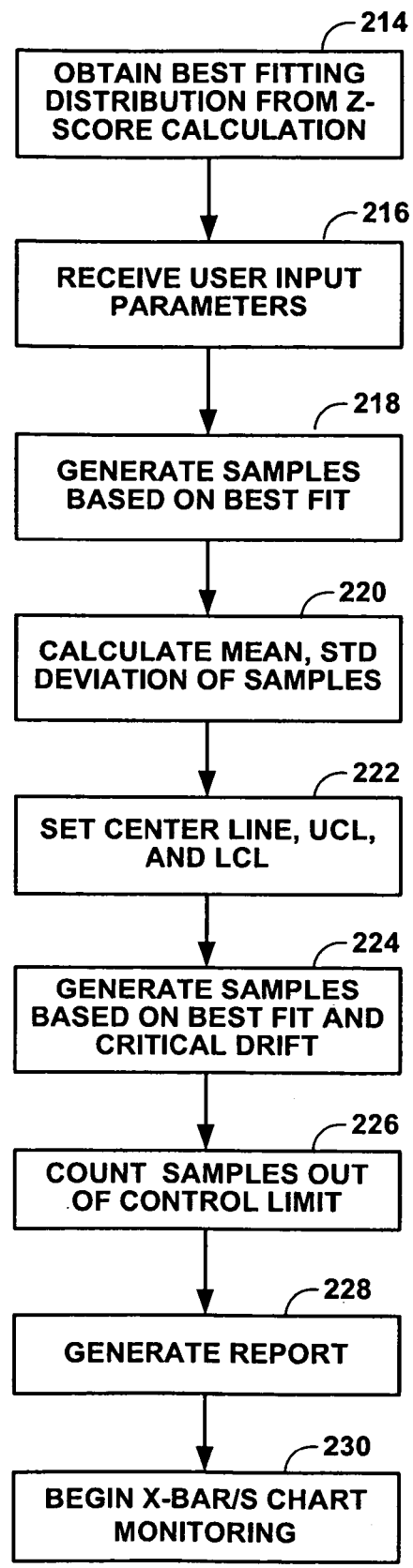
FIG. 17 is a flowchart illustrating example operation of a control limit determination module in determining adaptive control limits.

FIG. 17 is a flowchart illustrating example operation of control limit determination module 44 in determining adaptive control limits. Typical quality control systems use statistical process control mechanisms such as an Xbar-R chart. The Xbar-R chart notifies a user when there is evidence that a process has drifted. This is done by imposing an upper control limit (UCL) and a lower control limit (LCL) such that if the process is stable, the chance that a sample will fall outside these control limits is minimal. Data analysis system 12 uses an Xbar-S chart, which is a more sensitive control mechanism for detecting drift in a process. The Xbar-S chart may also provide more information about what kind of drift is happening. Data analysis system 12 may automatically turn on the Xbar-S chart feature of control limit determination module 44 when the Z-score is below a certain level, e.g., $Z_{ST}<10$. The Xbar-S chart may be based on the best fit PDF, obtained by the process described above. Control limit determination module 44 may determine the adaptive control limits, for example, after the baseline PDF has been established. Control limit determination module 44 may obtain the best-fitting distribution as determined by the Z-score determination process described above with respect to FIGS. 4A-4D (214). In particular, control limit determination module 44 may obtain the distribution type and the distribution parameters from database 22.

Control limit determination module 44 also receives user input via user interface 30 (216). The user input contains parameters, such as critical drift, $\delta$, which is the minimum amount of drift the user wants to detect, and the in-control Average Run Length ($ARL_{ic}$), which defines how many false triggers the user will tolerate for the control chart. For example, if $ARL_{ic}=370$ (which is equivalent to a $3\sigma$ control limit), this means there will be an average of one false trigger per 370 samples. The user may also input the out-of-control ARL (ARL$_{ooc}$), which defines how sensitive the control chart is in detecting the drift when it happens. For example, if ARL$_{ooc}$=5, this means that the control chart will need an average of five samples to trigger that the process has drifted by amount δ. The user may also input a sub-group size, which defines the number of data points per sample. The subgroup size has a direct affect on the ARL$_{ooc}$.

Figure 18:
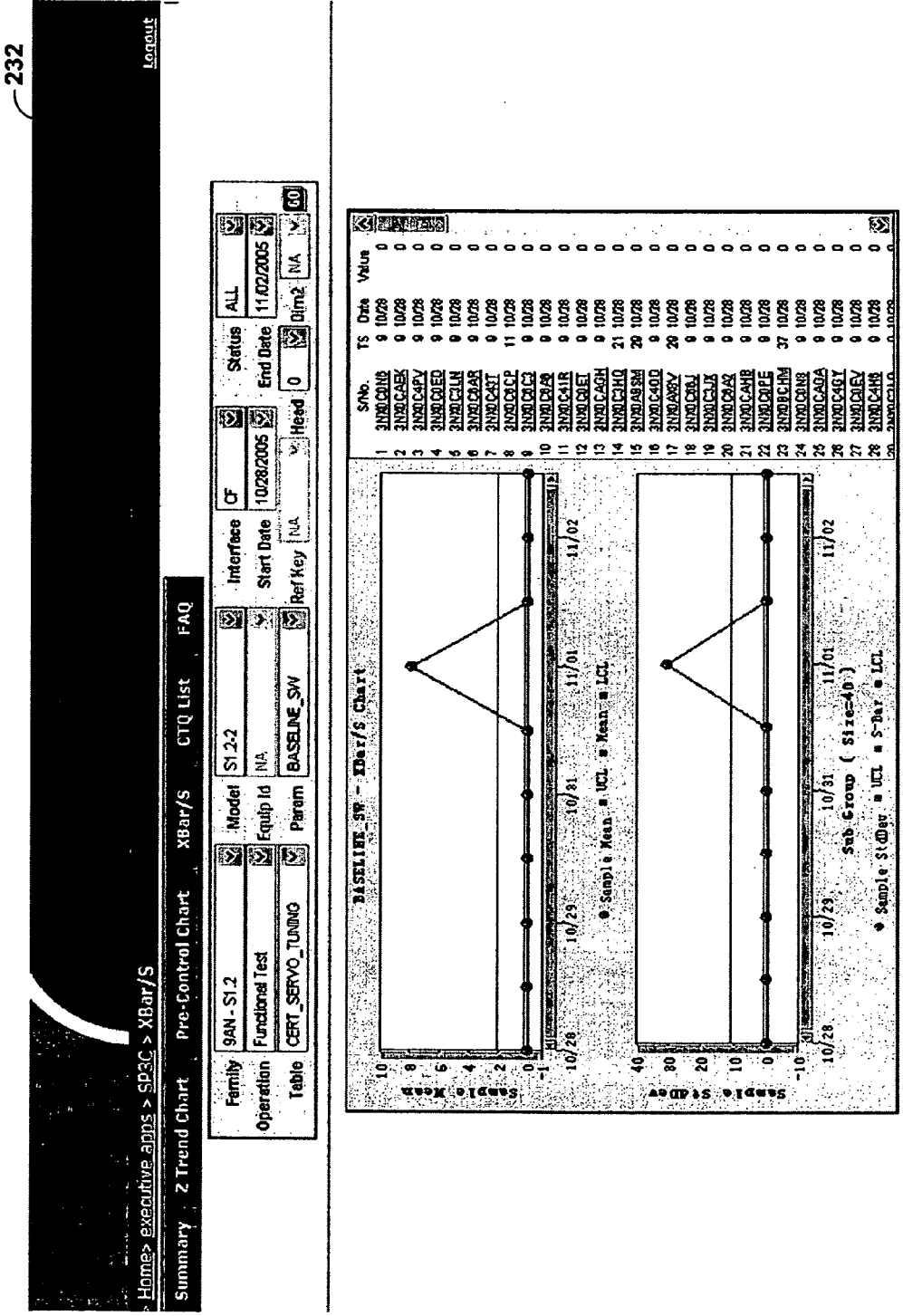
FIG. 18 is an exemplary report generated by the data analysis system as viewed on a user interface.

Control limit determination module 44 generates samples of data using a MonteCarlo simulation, based on the best fitting distribution (218). For example, control limit determination module 44 may generate 30 columns of 40,000 samples. Control limit determination module 44 calculates the mean and standard deviation of the generated samples (220), and may calculate a center line and an appropriate LCL and UCL based on the mean and standard deviation, that meets the user requirements (222). Control limit determination module 44 generates samples again based on both the best fit distribution and the critical drift (224), and counts the samples that are out of the control limit to compute ARL$_{ooc}$ (226). If the computed ARL$_{ooc}$ does not meet the requirements of the user, control limit determination module 44 may re-calculate the subgroup size. Control limit determination module 44 may generate a report (228), such as report 232 of FIG. 18. FIG. 18 is an exemplary report generated by data analysis system 12 as viewed on user interface 30. The user may click comments dropdown button 234 to reveal comment fields (not shown) in which the user may enter corrective actions taken or other comments. Control limit determination module 44 may begin Xbar-S chart monitoring to monitor for triggered events, and to ensure that the ARL$_{ooc}$ remains within user requirements. Control limit determination module 44 may automatically recalculate the control limits according to a preset schedule, upon activation of a new CTQ parameter, or upon a change in the baseline PDF. Data analysis system 12 may also provide a daily cumulative count control chart (CCCC) report.

When out of control points occur, data analysis system 12 may compute the sample $Z_{ST}$, sample mean, sample standard deviation, and sample p-value based on the latest 10,000 data points from the Z-score sample pool, and will only trigger in the following situations:

$$\frac{|Z_{STsample} - Z_{reference}|}{Z_{reference}} > 10\% \text{ for } Z\text{-score trigger} \quad (24)$$

$$\frac{|\mu_{sample} - \mu_{reference}|}{\mu_{reference}} > 10\% \text{ for } X\text{-bar Chart trigger} \quad (25)$$

$$\frac{|\sigma_{sample} - \sigma_{reference}|}{\sigma_{reference}} > 10\% \text{ for } S\text{-Chart trigger} \quad (26)$$

$$\frac{|p_{sample} - p_{reference}|}{p_{reference}} > 10\% \text{ for } CCCC \text{ trigger} \quad (27)$$

CASE STUDY EXAMPLE 2

Traditional control limit performance was compared with performance of the adaptive control limits of data analysis system 12. A particular CTQ which follows an Exponential distribution with λ=0.2 was chosen for this demonstration. The user input settings were as follows: (a) Distribution: Exponential, λ=0.2; (b) δ=3; (c) ARL$_{ic}$=370 (3 sigma equivalent); (d) ARL$_{oc}$=2; (e) Subgroup Size=5. With this configuration, the performance of the control chart between using traditional and adaptive control limits were compared.

Control limits for conventional Xbar-R charts were calculated using the following formulas:

$$UCL = \bar{\bar{X}} + A_2\bar{R} = \mu_{\bar{X}} + 3\sigma_{\bar{X}} \quad (28)$$

$$\text{CenterLine} = \bar{\bar{X}} = \mu_{\bar{X}} \quad (28)$$

$$LCL = \bar{\bar{X}} - A_2\bar{R} = \mu_{\bar{X}} - 3\sigma_{\bar{X}} \quad (30)$$

$$UCL = D_4\bar{R} = \bar{R} + 3\sigma_R \quad (31)$$

$$\text{CenterLine} = \bar{R} \quad (32)$$

$$LCL = D_3\bar{R} = \bar{R} - 3\sigma_R \quad (33)$$

where $A_2$, $D_3$, and $D_4$ are standard control chart constants that depend on subgroup size, and where equations 28-30 are for the Xbar chart, and equations 31-33 are for the R-chart. These equations are based on the assumption of normality.

The results are shown in Table 2:

TABLE 2

| X-Bar Chart | Traditional LCL, UCL | Simulated Result | Adaptive LCL, UCL |
|---|---|---|---|
| LCL | −1.71 | −1.71 | 0.711765 |
| UCL | 11.71 | 11.71 | 13.63 |
| ARL (in-control) | 370.00 | 135.14 | 357.14 |
| ARL (out-of-control) | 20.56 | 7.30 | 14.33 |

The first column shows the traditional LCL and UCL calculation based on a normal distribution and its expected ARLs, and the second column shows the online simulated results if these control limits were used. As illustrated, the control chart had more than two times more false triggers than the user expected. But if the adaptive control limits were used, the user could directly control the ARL$_{ic}$ to the level the user could tolerate.

Figure 19A:
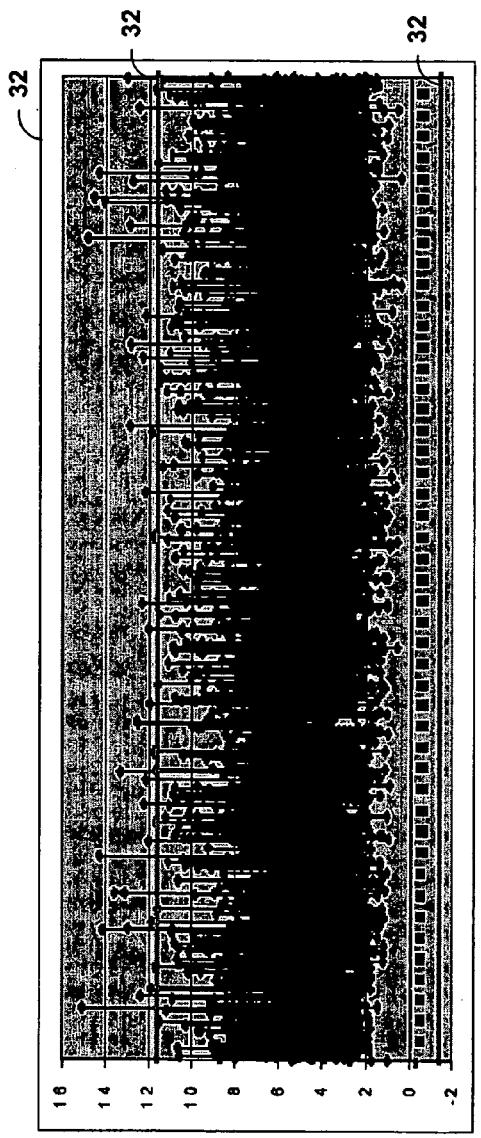
FIG. 19A is a graph illustrating simulated data of an exemplary case study for control limits calculated based on a normal distribution approximation.

FIG. 19A is a graph illustrating simulated data of the case study for control limits calculated based on a normal distribution approximation. As seen in FIG. 19A, the calculated control limits were inappropriate, as there were too many triggers beyond the UCL and no triggers below the LCL.

Figure 19B:
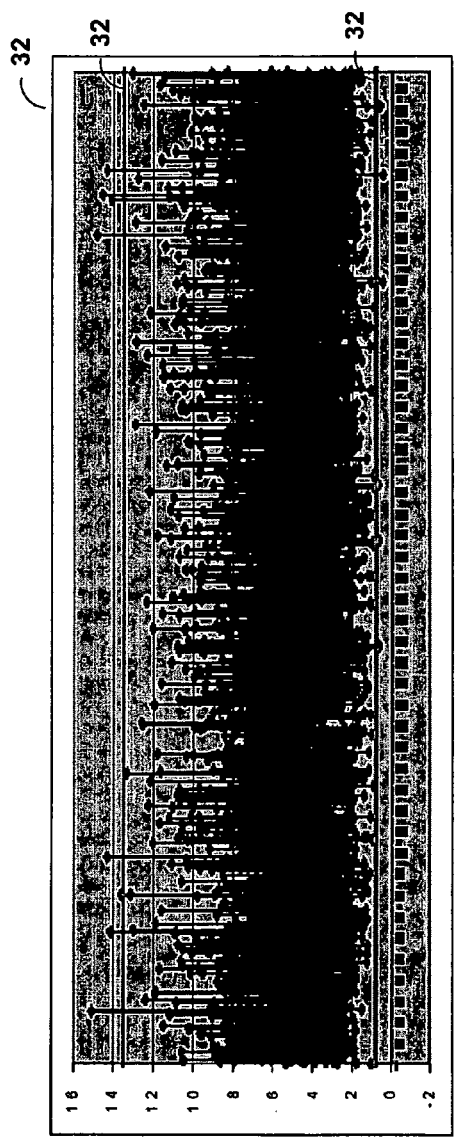
FIG. 19B is a graph illustrating simulated data based on adaptive control limits obtained from a best fit PDF.

FIG. 19B is a graph illustrating simulated data based on the adaptive control limits based on the best fit PDF. As shown in FIG. 19B, when the adaptive control limits are used, there are about equal triggers from both the UCL and the LCL, and the number is close to the specified 1/370.

The next step in this example was to assess if an ARL$_{oc}$ of 14 was good enough. This depends on the sampling frequency versus the time it took from the sampling point until the product was shipped out to the customer, and the severity of the drift. Typically, it is desirable to have the ARL$_{oc}$ small enough so the factory has enough time to hold back the affected product before it is shipped to the customer. An ARL$_{oc}$ of less than 2 may be preferable, but this would require a larger subgroup size. Thus, a trade off may be required, and representatives from Quality Assurance, Engineering, and Production staff may collectively decide on the appropriate level.

If a larger subgroup size was feasible, data analysis system 12 could do a reverse calculation to search for the optimum subgroup size. For this case study, it was found that the optimum subgroup size was 35, and the LCL and UCL for a subgroup size of 35 are 3.1 and 8.79, respectively. This results in an ARL$_{ic}$ of 357.14 and an ARL$_{oc}$ of 1.98, which is less than 2, as desired. Various embodiments of the invention have been described. These and other embodiments are within the scope of the following claims.

The invention claimed is:

1. A method comprising:
    receiving data for a product;
    fitting the data with a plurality of probability density functions (PDFs);
    selecting a PDF that best fits the data;
    generating one or more performance capability parameters for the product based on the best fitting PDF;
    generating a report that presents at least one of the performance capability parameters; and
    adjusting statistical control limits for the product based on the data, wherein adjusting statistical control limits comprises:
        generating a first set of data samples using the selected PDF,
        calculating new control limits from the first set of data samples,
        generating a second set of data samples,
        determining an average run length (ARL) value from the second set of data samples and the new control limits, and
        comparing the determined ARL value to an acceptable ARL value.

2. The method of claim 1, further comprising:
    providing a user interface for allowing a user to separate the data into two or more data sets, wherein one of the data sets is a main distribution data set;
    fitting the main distribution data set with the plurality of PDFs; and
    selecting a PDF that best fits the main distribution data set.

3. The method of claim 1, wherein receiving data for a product further comprises receiving real-time data from a product testing floor.

4. The method of claim 1, wherein selecting the PDF comprises comparing an actual defect rate with an estimated defect rate from each of the PDFs; and computing a validity rating for the data and each of the PDFs.

5. The method of claim 4, wherein comparing the actual defect rate with the estimated defect rate comprises computing a $\chi^2$ indicator for each of the PDFs and selecting the smallest $\chi^2$ indicator.

6. The method of claim 4, wherein computing the validity rating comprises computing based on a p-value, kurtosis, and skewness of the data.

7. The method of claim 4, further comprising adjusting a specification limit when the actual defect rate is zero.

8. The method of claim 1, wherein fitting the data with a plurality of PDFs comprises fitting the data with at least two of the group consisting of a normal distribution, an exponential distribution, a Weibull distribution, a 3-Parameter Weibull distribution, a uniform distribution, a Laplace distribution, a power transformation, a logistic distribution, or a 3-parameter LogLogistic distribution.

9. The method of claim 1, further comprising:
    obtaining parameters associated with the selected PDF;
    adjusting statistical control limits based on the parameters;
    triggering a user when a predetermined amount of the received data is outside of the adjusted statistical control limits;
    using a one-sided pre-control chart when one of the parameters is at or above a threshold; and
    using a confidence interval control chart when the parameter is below the threshold.

10. The method claim 9, wherein the parameter is $Z_{ST}$ and the threshold is 10.

11. The method of claim 9, wherein using a one-sided pre-control chart comprises:
    obtaining a specification limit;
    determining a lower pre-control limit using the specification limit; and
    generating a report that shows the received data relative to the specification limit and the lower pre-control limit.

12. The method of claim 9, wherein using a confidence interval control chart comprises:
    determining an upper confidence level and a lower confidence level; and
    generating a report that shows the received data relative to the upper confidence level and the lower confidence level.

13. The method of claim 1, wherein the at least one of the performance capability parameters comprises at least one of a defects per opportunity (DPO) parameter, a $C_{pk}$ parameter, a Z-score parameter, and a Z-margin parameter.

14. The method of claim 1, wherein receiving the data for the product comprises receiving testing data for the product, wherein fitting the data with the plurality of PDFs comprises fitting the testing data with the plurality of PDFs, and wherein selecting the PDF that best fits the data comprises selecting the PDF that bests fits the testing data.

15. The method of claim 9, further comprising:
    determining whether the parameter is at or above the threshold; and
    selecting between using the one-sided pre-control chart and using the confidence interval control chart based on whether the parameter is at or above the threshold.

16. A system comprising:
    a data acquisition module that acquires data for a product;
    a probability density function (PDF) fitting module that fits the data with a plurality of PDFs, selects a PDF that best fits the data, and generates one or more performance capability parameters for the product based on the best fitting PDF;
    a report generator that generates a report that presents at least one of the performance capability parameters; and
    a control limit determination module that generates a first set of data samples using the selected PDF, calculates new control limits from the first set of data samples, generates a second set of data samples, determines an average run length (ARL) value from the second set of data samples and the new control limits, and compares the determined ARL value to an acceptable ARL value.

17. The system of claim 16, further comprising:
    a database that stores the data; and
    a PDF repository that stores the plurality of PDFs.

18. The system of claim 16, further comprising a user interface for allowing a user to separate the data into two or more data sets, wherein one of the data sets is a main distribution data set, wherein the PDF fitting module fits the main distribution data set with the plurality of PDFs and selects a PDF that best fits the main data set.

19. The system of claim 16, wherein the data acquisition module acquires real-time data from a product testing floor.

20. The system of claim 16, wherein the control limit determination module adjusts statistical control limits for the product based on the data.

21. The system of claim 16, wherein the plurality of PDFs include at least two of the group consisting of a normal distribution, an exponential distribution, a Weibull distribution, a 3-Parameter Weibull distribution, a uniform distribution, a Laplace distribution, a power transformation, a logistic distribution, or a 3-parameter LogLogistic distribution.

22. The system of claim 16, further comprising a trimming module that automatically separates the data into two or more data sets when the data comprises two or more data distributions, wherein one of the data sets is a main distribution data set, and wherein the PDF fitting module fits the main distribution data set with the plurality of PDFs and selects a PDF that best fits the main data set.

23. The system of claim 16, wherein the at least one of the performance capability parameters comprises at least one of a defects per opportunity (DPO) parameter, a $C_{pk}$ parameter, a Z-score parameter, and a Z-margin parameter.

24. The system of claim 16, wherein the data acquisition module acquires testing data for the product, and wherein the PDF fitting module fits the testing data with the plurality of PDFs and selects the PDF that bests fits the testing data.

25. A computer-readable medium comprising instructions for causing a processor to:
receive data for a product;
fit the data with a plurality of probability density functions (PDFs);
select the PDF that best fits the data;
generate one or more performance capability parameters for the product based on the best fitting PDF;
generate a report that presents at least one of the performance capability parameters;
generate a first set of data samples using the selected PDF;
calculate new control limits from the first set of data samples;
generate a second set of data samples;
determine an average run length (ARL) value from the second set of data samples and the new control limits; and
compare the determined ARL value to an acceptable ARL value.

26. The computer-readable medium of claim 25, further comprising instructions to cause the processor to:
provide a user interface for allowing a user to separate the data into two or more data sets, wherein one of the data sets is a main distribution data set;
fit the main distribution data set with the plurality of PDFs; and
select a PDF that best fits the main distribution data set.

27. The computer-readable medium of claim 25, further comprising instructions to cause the processor to receive real-time data from a product testing floor.

28. The computer-readable medium of claim 25, further comprising instructions to cause the processor to adjust statistical control limits for the product based on the data.

29. The computer-readable medium of claim 25, further comprising instructions to cause the processor to fit the data with at least two of the group consisting of a normal distribution, an exponential distribution, a Weibull distribution, a 3-Parameter Weibull distribution, a uniform distribution, a Laplace distribution, a power transformation, a logistic distribution, or a 3-parameter LogLogistic distribution.

30. The computer-readable medium of claim 25, wherein the at least one of the performance capability parameters comprises at least one of a defects per opportunity (DPO) parameter, a $C_{pk}$ parameter, a Z-score parameter, and a Z-margin parameter.

31. The computer-readable medium of claim 25, wherein the instructions for causing the processor to receive the data for the product comprise instructions for causing the processor to receive testing data for the product, wherein instructions for causing the processor to fit the data with the plurality of PDFs comprise instructions for causing the processor to fit the testing data with the plurality of PDFs, and wherein instructions for causing the processor to select the PDF that best fits the data comprise instructions for causing the processor to select the PDF that bests fits the testing data.

32. A method comprising:
receiving data for a product;
fitting the data with a plurality of probability density functions (PDFs);
selecting a PDF that best fits the data;
generating one or more performance capability parameters for the product based on the best fitting PDF;
generating a report that presents at least one of the performance capability parameters;
automatically separating the data into two or more data sets when the data comprises two or more data distributions, wherein one of the data sets is a main distribution data set, wherein automatically separating the data into the two or more data sets comprises automatically separating the data into three data sets when the data comprises three data distributions, wherein the data sets comprise a main distribution, an upper tail section, and a lower tail section;
fitting the main distribution data set with the plurality of PDFs;
selecting a PDF that best fits the main distribution data set;
determining a proportion of each of the lower tail section, the main distribution, and the upper tail section with respect to the data; and
computing defects per opportunity (DPO) rates for each of the lower tail section and the upper tail section.

* * * * *